(12) United States Patent
McCutcheon et al.

(10) Patent No.: US 6,285,525 B1
(45) Date of Patent: Sep. 4, 2001

(54) DAMPED SPACER ARTICLES AND DISK DRIVE ASSEMBLIES CONTAINING DAMPED SPACER ARTICLES

(75) Inventors: Jeffrey W. McCutcheon, Eagan; Thomas L. Morse, Roseville; Michael A. Jung, Inver Grove Heights; Brian L. Johnson, Hastings, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/108,981

(22) Filed: Jul. 1, 1998

(51) Int. Cl.$^7$ .................................................. G11B 17/08
(52) U.S. Cl. ............................................................ 360/98.08
(58) Field of Search .............................................. 360/98.08

(56) References Cited

U.S. PATENT DOCUMENTS

| | | | |
|---|---|---|---|
| 2,819,032 | 1/1958 | Detrie et al. | 175/346 |
| 3,071,217 | 1/1963 | Gould | 52/403.1 |
| 3,078,969 | 2/1963 | Campbell et al. | 52/403.1 |
| 3,159,249 | 12/1964 | Lazan | 188/268 |
| 3,160,549 | 12/1964 | Caldwell et al. | 428/317.3 |
| 4,324,400 * | 4/1982 | Tse | 273/76 |
| 4,495,432 | 1/1985 | Katsuma et al. | 310/328 |
| 4,539,673 | 9/1985 | Winslow | 369/284 |
| 4,870,429 | 9/1989 | Fujita et al. | 346/137 |
| 4,945,432 | 7/1990 | Matsudaira et al. | 360/98.02 |
| 5,131,619 | 7/1992 | Daugherty et al. | 248/635 |
| 5,183,863 | 2/1993 | Nakamura et al. | 525/438 |
| 5,262,232 | 11/1993 | Wilfong et al. | 428/327 |
| 5,308,887 | 5/1994 | Ko et al. | 522/148 |
| 5,367,418 | 11/1994 | Chessman et al. | 360/99.12 |
| 5,422,768 | 6/1995 | Roehling et al. | 360/98.08 |
| 5,538,774 | 7/1996 | Landin et al. | 428/64.1 |
| 5,590,004 | 12/1996 | Boutaghou | 360/99.12 |
| 5,663,851 | 9/1997 | Jeong et al. | 360/98.08 |
| 5,691,037 | 11/1997 | McCutcheon | 428/172 |
| 5,725,931 | 3/1998 | Landin et al. | 428/134 |
| 5,781,374 | 7/1998 | Moir et al. | 360/99.12 |
| 6,040,957 | 3/2000 | Konings | 360/98.08 |

FOREIGN PATENT DOCUMENTS

| | | |
|---|---|---|
| 0 341 785 | 11/1989 | (EP) . |
| 0507515 | 10/1992 | (EP) . |
| 93/01599 | 1/1993 | (WO) . |
| WO 96/21560 | 7/1996 | (WO) . |

OTHER PUBLICATIONS

*The Handbook of Metal Forming*, Kurt Lange, Editor, (McGraw–Hill Book Company), ISBN 0–07–036285–8, Preface, Table of Contents and ISBN number only.
Patent Abstract of Japan, vol. 009., No. 299, JP 60 133567, Jul. 16, 1985.

\* cited by examiner

*Primary Examiner*—David Davis
(74) *Attorney, Agent, or Firm*—Lisa M. McGeehan

(57) ABSTRACT

The present invention relates to a vibration damped spacer articles having good force (torque and/or pressure and/or stress) retention, and disk drives having a damped spacer article and a rotatable storage article inserted therein.

12 Claims, 15 Drawing Sheets

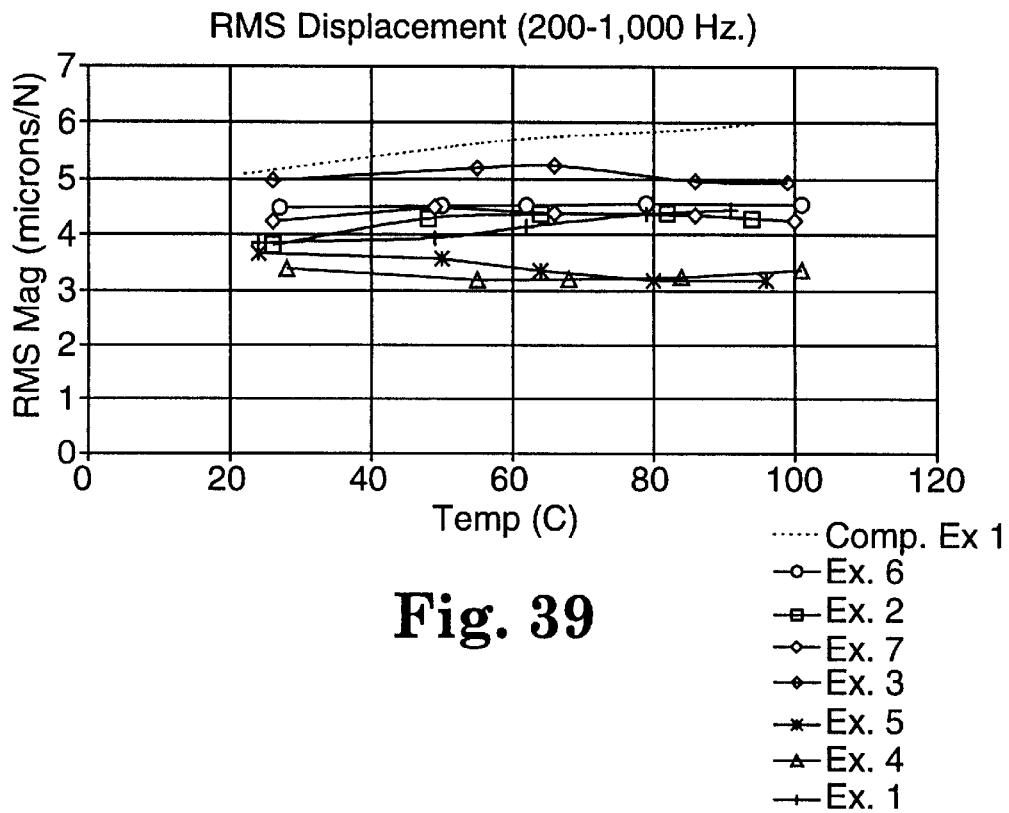

Fig. 39

TABLE 1

| Spacer Design: | Temperature C & RMS Magnitude ( microns/N ) | | | | |
| --- | --- | --- | --- | --- | --- |
| | 22-28 C | 48-55 C | 62-68 C | 79-86 C | 91-106 C |
| Example 1 | 3.85 | 3.95 | 4.14 | 4.36 | 4.43 |
| Percent Reduction in RMS .vs.Comp. Ex. 1 | 24 | 29 | 28 | 26 | 26 |
| Example 2 | 3.82 | 4.28 | 4.36 | 4.37 | 4.28 |
| Percent Reduction in RMS .vs.Comp. Ex. 1 | 25 | 23 | 24 | 25 | 28 |
| Example 3 | 4.97 | 5.20 | 5.24 | 4.96 | 4.94 |
| Percent Reduction in RMS .vs.Comp. Ex. 1 | 02 | 07 | 09 | 15 | 17 |
| Example 4 | 3.41 | 3.20 | 3.21 | 3.25 | 3.37 |
| Percent Reduction in RMS .vs.Comp. Ex. 1 | 33 | 43 | 44 | 45 | 44 |
| Example 5 | 3.68 | 3.58 | 3.37 | 3.19 | 3.18 |
| Percent Reduction in RMS .vs.Comp. Ex. 1 | 28 | 36 | 41 | 46 | 47 |
| Example 6 | 4.47 | 4.51 | 4.51 | 4.55 | 4.53 |
| Percent Reduction in RMS .vs.Comp. Ex. 1 | 12 | 19 | 21 | 22 | 24 |
| Example 7 | 4.23 | 4.48 | 4.37 | 4.34 | 4.25 |
| Percent Reduction in RMS .vs.Comp. Ex. 1 | 17 | 20 | 24 | 26 | 29 |
| Comparitive Example 1 | 5.09 | 5.59 | 5.74 | 5.86 | 5.98 |

Fig. 40

TABLE 2

| Spacer Examples | Time of measurement (minutes) and Force Retention Percent | | | | | | | | | | | | |
|---|---|---|---|---|---|---|---|---|---|---|---|---|---|
| | 0 | 0.167 | 0.333 | 0.500 | 0.667 | 0.833 | 1.000 | 2.000 | 3.000 | 4.000 | 5.000 | 10.000 | 15.000 |
| Comp. Ex 1 | 100 | 99 | 99 | 99 | 98 | 98 | 98 | 98 | 98 | 98 | 98 | 98 | 97 |
| Comp. Ex. 2 | 100 | 98 | 96 | 96 | 95 | 95 | 94 | 93 | 92 | 92 | 91 | 91 | 90 |
| Comp. Ex. 3 | 100 | 97 | 96 | 95 | 94 | 94 | 94 | 92 | 91 | 91 | 90 | 89 | 89 |
| Ex. 8 | 100 | 99 | 99 | 98 | 98 | 98 | 98 | 98 | 98 | 97 | 97 | 97 | 97 |
| Ex. 6 | 100 | 99 | 99 | 99 | 99 | 99 | 99 | 99 | 99 | 99 | 99 | 99 | 98 |
| Ex. 4 | 100 | 98 | 97 | 96 | 96 | 96 | 96 | 95 | 94 | 94 | 94 | 93 | 93 |
| Ex. 9 | 100 | 98 | 97 | 97 | 96 | 96 | 96 | 95 | 95 | 95 | 95 | 95 | 95 |
| Ex. 1 | 100 | 99 | 98 | 98 | 98 | 98 | 98 | 97 | 97 | 97 | 96 | 96 | 96 |

DAMPED SPACER ARTICLES AND DISK DRIVE ASSEMBLIES CONTAINING DAMPED SPACER ARTICLES

FIELD OF THE INVENTION

The present invention relates to a vibration damped spacer article, the spacer article preferably having good force (torque and/or pressure and/or stress) retention and the ability to provide damping to an adjacent rotatable storage article on a disk drive assembly. The present invention provides a damped spacer article that preferably has a sufficient force retention to prevent significant rotatable storage article movement during use. The present invention also provides a disk drive having rotatable spacer article(s) and the damped spacer article(s) positioned thereon.

BACKGROUND OF THE INVENTION

Periodic or random vibrations or shocks can excite the resonant frequencies in a rotatable storage article (such as the disk(s) in a disk drive), which can be problematic due to the resultant formation of undesirable stresses, displacements, fatigue, and even sound radiation. Such undesirable vibrations or shocks are typically induced by external forces and can be experienced by a wide variety of articles and under a variety of conditions. For example, resonant vibrations can cause excessive vertical displacement of an optical disk's surface during operation, which may lead to poor laser focus. Proper laser focus is a key to optimum write/read characteristics, signal quality, and tracking ability.

Various techniques have been used to reduce vibrational and shock effects (stresses, displacements, etc.) on rotatable storage articles. Three basic techniques to reduce vibration and shock effects include:

1) adding stiffness or mass to the rotatable storage article so that the resonant frequencies of the rotatable storage article are not excited by a given excitation source,
2) isolating the rotatable storage article from the excitation source so the vibrational or shock energy does not excite the rotatable storage article's resonant frequencies, and
3) damping the rotatable storage article so that given excitations from the excitation source do not result in excessive negative effects at the resonant frequencies of the rotatable storage article.

An isolation technique for limiting vibration transmission is described in U.S. Pat. No. 4,870,429. A single-sided or double-sided optical disk structure is described that includes two sheets of substrate bonded to each other with a foam spacer interposed between the two substrates to restrict or isolate the vibrations caused by external forces. The spacer is made from an elastomeric foam material and is positioned between the two substrates to restrict the transmission of such forces (e.g., vibrations or shocks). The thickness of the spacer is stated to be preferably not less than 0.2 mm, more preferably not less than 0.4 mm, because, when the thickness is too small, the effect of the spacer to restrict or isolate forces is not exhibited sufficiently. Such a system adds to the overall size of the rotatable storage article and may be impractical where close positioning of the article to other structures is desired.

Two types of surface or external damping treatments that can be used to reduce shock or vibration impact on rotatable storage articles are: (1) free layer damping treatments; and (2) constrained layer damping treatments. Both of these damping treatments can provide high levels of damping to a structure, i.e., dissipation of undesirable vibrations, without sacrificing the stiffness of the structure. The use of viscoelastic materials as exterior surface damping treatments is described in EP 0507515. Examples of additional surface or external damping techniques are described, for example, in U.S. Pat. Nos. 2,819,032; 3,071,217; 3,078,969; 3,159,249; and 3,160,549. However, all of the aforementioned damping techniques can add complexity and expense to the design of the rotatable storage article, limit the amount of exterior article surface available for data storage, and can increase the overall size of the article.

U.S. Pat. No. 5,725,931 discloses a constrained layer damper having slits and/or cutouts therein, which constrained layer damper provides improved damping performance. The constrained layer damper is useful for damping rotatable storage media, such as compact disks.

U.S. Pat. No. 5,691,037 and WO 96/21,560 disclose vibration damped laminate articles having improved force (torque and/or pressure and/or stress) retention, a method of making one article type, and novel tools used to make the one article type. The first laminate comprises at least one layer of damping material between at least two substrate layers. At least one deformation area is present in the laminate where the substrates are plastically deformed such that they are closer together than in non-deformed areas of the substrate and the damping material has less mass than in a non-deformed area of the article. The deformation area provides areas of good force retention for an attachment device attached thereto. The second laminate, which is not deformed, contains an additive of sufficient modulus, diameter and loading in its vibration damping layer to provide improved force retention. Spacer articles for disk drives are not discussed.

U.S. Pat. No. 5,538,774 provides a method for internally damping a rotatable storage article that is subject to resonant vibrations. The rotatable storage article, although capable of providing good damping, requires a redesign of the rotatable storage article to include the internal damping material, which can be costly to manufacture.

The typical method of providing spacing between disks in a disk drive type application involves the use of solid spacers between the disks. These spacers can be made from many materials, including aluminum, ceramics, stainless steel, rigid plastics, etc. These spacers, however, provide minimal vibration damping.

As the read and write tracks per inch (TPI) and the recording density of disks increase, there is a need to improve the vibration damping of disks economically and simply to implement the disks in existing and future disk drives. With new recording head technology, higher TPIs are possible (10,000–100,000 TPI and above). This now makes vibrations in disks more important to reduce, as vibrations in disks can reduce the TPI that can be reliably read and written. In the past, the spacers have been used to space the disks apart and provide some isolation or improved thermal expansion properties to prevent disks, such as ceramic disks, from breaking.

For example, U.S. Pat. No. 5,663,851 discloses a disk drive spindle hub assembly for a hard disk drive that includes a spindle hub with a stack of information storage disks journaled about the spindle hub in a spaced-apart, vertically aligned relation. Annular spacers are positioned between adjacent information storage disks in order to space the disks apart in the vertically aligned relation of the spindle hub. A disk clamp is configured to concentrically clamp the stack of information storage disks in axial alignment with the spindle hub. A dummy disk comprising an arrangement of a metal plate, a damping portion, and a polyester film is disposed between the disk clamp and the storage disk in order to absorb spurious vibrations and minimize stress concentrations and disk distortion when the storage disks are mounted for rotation within the hard disk drive.

Newer drive rotation speeds of 7,200 and above revolutions per minute (RPMs) plus increased shock requirements (500 to 1,000 or more g of force) require a high force retention in the spindle assembly to prevent disks from slipping or shifting on the spindle. Shipping or shifting can cause data location to be lost or degraded, hindering read/write performance and/or drive reliability.

U.S. Pat. No. 5,367,418 discloses a hub assembly that incorporates o-rings that can absorb external loads applied in either an axial or radial direction relative to the hub.

U.S. Pat. No. 5,590,004 discloses a resilient clamping member positioned between a spindle flange and the upper side of a disk, with a compliant element supported by the spindle rim and contacting the lower side of the disk.

U.S. Pat. No. 4,945,432 discloses a spacer design that serves as a buffer when the magnetic disks and the spacers are compressed together. The substrates of the magnetic disks are made of non-metallic materials, such as glass or ceramics, but do not break easily by the motion of the spindle or the change in temperature because either the 1) adhesive used to form a unistructural assembly of the magnetic disks or 2) spacers or elastic members inserted in annular indentations formed in the spacers serve as buffers when the magnetic disks and the spacers are compressed together.

U.S. Pat. No. 5,422,768 discloses a compliant hard disk assembly for a recording/reproducing device. According to the abstract, to minimize unwanted motion in a hard disk assembly in a hard disk drive, an elastomeric support is employed to mount a hard disk pack for rotation by a motor rotor of a disk spindle motor. The hard disk pack includes a hard disk support ring that has opposite annular axial faces upon which the hard disks are securely mounted and axially spaced thereby. An elastomeric connection between the hard disk support ring and a cylindrical body of the motor rotor of the disk spindle motor provides a soft, or compliant, support for the hard disk pack.

A need exists for a spacer articles that address the needs of newer hard disk drives that have higher TPIs (greater than 10,000 TPI, typically 17,000 or more TPI) and higher RPMs (greater than 5,000 RPM, typically 7,200 RPM or higher) that lead to more disk vibrations as drive disk capacity increases. There is also a need for thinner disks to allow more disks in a drive format height. The disks need to be adequately damped to provide a minimally vibrating surface for reading and writing information or the drive will not be able to perform at the next level of capacity that is now needed to meet growing industry demands for a low cost megabyte of memory.

SUMMARY OF THE INVENTION

Although internally damped rotatable storage articles as disclosed in U.S. Pat. No. 5,538,774 are very useful, it is not always economically feasible to provide all such articles with an internal damping material. Articles that do not have such internal damping material still require some kind of damping. Furthermore, rotatable storage articles that are internally damped may still benefit from additional damping.

Metal spacer rings, and the various drive designs described in the aforementioned patents, although providing at least some damping, may not provide as much damping as one would desire to meet the ever increasing needs for a more stable read/write disk surface.

Damped spacer articles of the invention can be used with both damped and undamped rotatable storage articles and are capable of providing excellent damping properties as well as good force retention. The spacer articles are preferably capable of providing a vibration-resistant disk drive assembly. Preferably the spacer article allows a rotatable storage article to maintain its shape and will not distort the typically flat rotatable storage article. Preferably the spacer article experiences little or no outgassing of components that could interfere with the drive reliability. Preferably the spacer article provides high force retention. The spacer articles are preferably designed such that the vibration damping material contained therein does not readily become squeezed out when a force is applied thereto.

Optionally, a spacer article further comprises in its vibration damping material an effective amount of an electrically conductive material so that the resistance between substrates is less than about 100 ohms.

BRIEF DESCRIPTION OF THE DRAWINGS

FIG. 39 illustrates a graph showing the spacer article performance comparison of temperature versus Root Mean Square (RMS) displacement for various rotatable storage articles described in the Examples.

FIG. 40 contains data for the graph in FIG. 39.

DEFINITION OF TERMS

Figure 1:
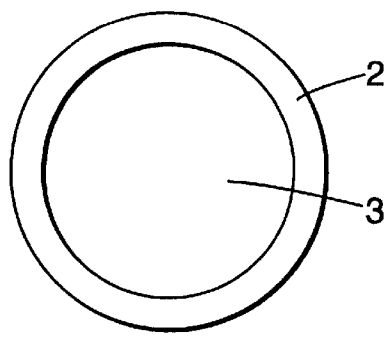
FIG. 1 illustrates a top view of a spacer article of the invention.

The term "attachment device" as used herein refers to items such as screws, bolts, clamps, nails, rivets, clamp/screw combinations, integrally molded attachment devices and other mechanical attachment devices that can hold the spacer article(s) along with the rotatable storage article(s) in a desired location, position, altitude or configuration with a desired level of stress and/or torque and/or pressure and/or force.

The term "means for securing the rotatable storage article and spacer article onto the spindle" includes, for example, attachment devices as well as heat shrinking.

The term "force application area" as used herein describes the area in which an article such as an attachment device, a rotatable storage article, another spacer article, etc., may contact the spacer article and impart a force (i.e., holding force) that is used to hold the spacer article in a position, location, altitude, or configuration.

An example of a "force application area" is an area of the spacer article under the flange of a clamp that in turn has force applied to it by a head of a screw which is directly above it, for example, the "force application area" being defined to extend through the entire spacer article.

The term "deformation area" as used herein describes a section of an article in which at least one substrate layer has been plastically deformed. The deformation area includes any article layer areas above and below the plastically deformed substrate areas. The deformation area is defined such that it does not include a through hole.

The force application area can be the same as, larger or smaller than the deformation area for the embodiment of the spacer article having a deformation area, when a deformation area is present in the spacer article. The deformation area is generally designed to be as small as required to meet the needs of the attachment device so as to have a minimal impact on the performance of the laminate spacer article in terms of resonant vibration control and noise generation or transmission.

The terms "residual spring effect" and "residual spring force" are used interchangeably herein to refer to the spring-type potential resistive force that exists between two or more substrate layers of a laminate that have a separation between them. This separation will require the attachment force of the attachment device to overcome the residual spring force during attachment device application. Substrate layers that are deformed such that no, or minimal, separation exists between the substrate layers will have no, or insignificant, residual spring force to overcome.

The term "spring back" as used herein refers to the tendency of the laminate substrate layers of deformed spacer articles to act as springs when put under a load. The substrate layers may be formed in a manner so that when force is applied to them, they are under stress. When the stress is removed, they will spring back at least partially to their initial position.

The terms "damped laminate" and "laminate" are used interchangeably herein to refer to a construction comprising at least two substrate layers and at least one layer of a vibration damping material comprising a viscoelastic material that has a lower storage modulus than the substrate layers it is positioned between. The laminate can also be of a multiple layer construction that may have more than two substrate layers and also more than one vibration damping material layer. The construction could also have vibration damping material layers adjacent to each other in layers or stripes or other patterns. The vibration damping material layers may be continuous or discontinuous. A discontinuous layer may be separated by space(s) and/or a nondamping material. A continuous layer may comprise the same damping material or different damping materials adjacent to each other, thereby forming a continuous surface. The substrate can comprise the same material or different substrate materials.

The terms "plastically deformed" and "plastic deformation" are used herein to describe the permanent change to a laminate's shape, profile, contour, or features that occurs when the substrate layers are exposed to: 1) a force or strain (typically from a punch tool and the tool's working surfaces) that imparts a force into the substrates that exceeds the substrates' yield strength and/or 2) to heat.

The term "rotatable storage article" as used herein refers to a media that has information stored on it and/or that is capable of storing information. The article is typically capable of being rotated in some manner that allows the data stored on the article to be passed by a read or write element to allow reading of information from the article, or writing of information on the article, or both. Examples of storage articles include rigid disk drive disks, optical disks, compact disks (CDs), magneto-optical disks, records, drums, floppy disks and the like.

The term "spacer article contact surface" as used herein refers to the surface arca(s) of the spacer article that an article above the spacer article comes into contact with, such as an attachment device, rotatable storage article, another spacer article, etc. and imparts the attachment device's force upon the spacer article.

A "through hole" as used herein refers to a hole that passes completely through an article. The term "through hole" as used herein is meant to include both completely enclosed through holes such as would be provided, for example, by a spacer article having a shape similar to the letter "o" and a partially enclosed through hole, which may have a shape similar to the letter "c," for example. A spacer article that has a shape that provides a completely enclosed through hole would be more typical. However, a spacer article that has more of a "c" shape and that does not provide a through hole that is completely enclosed may also be useful. The substrate and/or vibration damping material portion of a spacer article may, optionally, be broken, grooved, beveled, segmented, slotted, split, or non-continuous, as long as the spacer article has structural integrity and encompasses a through hole. For example, if the spacer article is a laminate with several substrate layers, one substrate layer may be segmented in such a way as not to affect the structural integrity of the article.

The term "working surface(s)" as used herein refers to the surfaces area(s) of a punch tool that come into physical contact with a laminate during the punch tool stamping operation when providing one of the spacer article embodiments of the invention.

The term "offset" as used herein refers to when: (1) the upper surface of the first substrate and the upper surface of the second substrate of a nested substrate spacer article are not level, (2) the lower surface of the first substrate and the lower surface of the second substrate are not level, and (3)

if the substrates are of unequal heights, the shorter substrate is positioned such that its upper surface extends above the upper surface of a taller substrate or such that its lower surface extends below the lower surface of the other substrate.

The term "disk drive" as used herein refers to devices that are capable of rotating rotatable storage articles (such as a compact disk, for example) in a manner that information may be retrieved from and/or provided thereon. Examples of these devices are CD-ROM drives, floppy drives, removable media drives, rigid disk drives, optical drives, magneto-optical drives, magnetic drives, DVD disk drives, and the like.

A "partial cross-section" with respect to a spacer article or a component thereof is the cross-section taken from the center of the through hole towards an outer perimeter of the article or component.

A "configuration in partial cross-section that is U-shaped" is defined as a cross-section taken from the center of the through hole towards an outer perimeter of the spacer article. The U-shape may, for example, be angular or rounded. It may also be sideways, right-side-up, or upside-down.

A "sideways U-shape in partial cross-section" refers to a cross-section taken from the center of the through hole towards an outer perimeter of the spacer article. The sideways U-shape may, for example, be angular or rounded.

DETAILED DESCRIPTION OF THE INVENTION

Various embodiments of useful spacer articles and disk drives are described herein.

SPACER ARTICLES

A number of spacer articles are laminates or include a laminate as a component thereof. These spacer articles include, for example, the spacer articles referred to herein as press-fit laminate spacer articles, deformed spacer articles, particulate/fiber containing spacer articles, welded spacer articles, and high modulus vibration damping material laminate spacer articles.

A laminate is prepared from an upper substrate layer (which is typically flat) and a lower substrate layer (which is typically flat) and at least one layer of vibration damping material comprising a viscoelastic material positioned between the upper and lower substrate layers. The substrate layers have a higher storage modulus than the viscoelastic material in the vibration damping material.

A wide variety of shapes are possible for the spacer articles. Each spacer article is typically circular in shape (although it may be oval, rectangular, etc). The outer and/or inner perimeter of the spacer articles may optionally be notched, jagged-edged, slotted, hatched, contain protrusions, etc. The spacer article is typically ring-shaped, as well as each component making up the spacer article (such as substrates, vibration damping material, and laminate made therefrom, etc.).

Each spacer article discussed herein has a diameter. The diameter of each spacer article typically ranges from about 1 to about 300 mm, preferably about 5 to about 100 mm, and most preferably about 10 to about 70 mm.

Each spacer article has a through hole. Each substrate layer (as well as each vibration damping material layer and laminate) also has a through hole positioned therein. The through hole may have a wide variety of shapes. Typically the through hole is a circular through hole that is centrally positioned therein, although it may be oval, rectangular, etc. Typically the through hole diameter ranges from about 0.5 to about 299.9 mm, preferably about 4.9 to about 99.9 mm, and most preferably about 9.9 to about 69.9 mm.

Each substrate layer is typically identical in dimensions and composition, although they may vary. For example, each substrate layer may vary as to thickness, diameter and/or topography, etc.

Each substrate layer is typically circular in shape (although it may be oval, rectangular, etc.). The outer and/or inner perimeter of each substrate layer may, optionally, be notched, jagged-edged, hatched, contain protrusions, etc. The two section spacer articles discussed herein, although including an inner vibration damping material layer, differ in that their substrate layers are not flat, but typically L- and T-shaped.

Typically each substrate layer has a length or diameter of about 1 to about 300 mm, preferably about 5 mm to about 100 mm, and most preferably about 10 mm to about 70 mm. Each substrate layer typically has a thickness of about 0.01 mm to about 25 mm, preferably about 0.05 to about 10 mm, and most preferably about 0.5 to about 5 mm.

Typically the thickness ratio of the upper and lower substrates ranges from about 1:1 to 1:20, preferably about 1:1 to about 1:5, even more preferably about 1:1 to about 1:1.5, and most preferably about 1:1.

The thickness of the vibration damping material layer typically ranges from about 0.001 to about 5 mm, preferably about 0.01 to about 1 mm, and most preferably about 0.02 to about 0.5 mm.

The spacer articles of the invention typically contain at least one vibration damping material layer or component, more typically 1–3 layers, preferably 1–2, and most preferably one layer, for reasons of simplicity of the article's manufacturing process and cost. Stiffness may also be sacrificed when more than one damping material layer or component is included. However, a wider temperature range of damping is possible when multiple layers of different vibration damping materials are included. Sufficient damping material should be used to obtain the desired damping effect, while balancing the structural requirements of the article.

SUBSTRATE MATERIAL

Each spacer article comprises a substrate. Substrates, such as substrate layers, substrate rings, substrate sections, substrate components, etc. useful in the article of the invention can be any material having a higher storage modulus than the viscoelastic material of the vibration damping material of the spacer article. Typical substrate materials have a Young's modulus greater than about $5 \times 10^5$ psi ($34.5 \times 10^8$ Pascals) at the operating temperature of the application (typically about −60 to 100° C.). Examples of suitable substrate materials include, but are not limited to, those selected from the group consisting of stainless steel, aluminum, aluminum alloys, copper, carbon steel, lead, glass, ceramics, polyethylenes, polyolefins, polycarbonates, polystyrenes, polyimides, polyesters, polyacetates, vinyl copolymers, poly acetals, and phenolics. The substrate may, optionally, be coated with a coating, such as paint, etc.

In the case of the plastically deformed spacer article, at least one substrate must be capable of being plastically deformed.

VIBRATION DAMPING MATERIAL

Each spacer article comprises a vibration damping material. The vibration damping material useful in the various spacer article embodiments comprises a viscoelastic material or combination of different viscoelastic materials. The properties described herein which are attributable to the viscoelastic material are typically also attributable to the vibration damping material itself.

Typical viscoelastic materials are those having a storage modulus of at least about 1.0 psi ($6.9 \times 10^3$ Pascals) and a loss factor of at least about 0.01 at the temperature and frequency of use (typically about −60 to 100° C.). Advantageously and preferably, the vibration damping material is placed in areas of high strain energy to provide improved damping in the desired frequency and temperature range.

A viscoelastic material is one that is viscous, and therefore capable of dissipating energy, yet exhibits certain elastic properties, and therefore is capable of storing energy. That is, a viscoelastic material is an elastomeric material typically containing long-chain molecules that can convert mechanical energy into heat when they are deformed. Such a material typically can be deformed (e.g., stretched) by an applied load and gradually regain its original shape or contract sometime after the load has been removed.

Typical viscoelastic materials for use in the vibration damping materials of the present invention have a storage modulus, i.e., measure of the energy stored during deformation, of at least about 1.0 psi ($6.9 \times 10^3$ Pascals) at the frequency and temperature of operation, more typically about 10–2000 psi ($6.9 \times 10^4$–$1.4 \times 10^7$ Pascals).

Typical viscoelastic materials for use in the vibration damping materials of the present invention have a loss factor, i.e., the ratio of energy loss to energy stored, of at least about 0.15. Preferably the loss factor is at least about 0.3, more preferably at least about 0.5, and most preferably about 0.7–10 in the frequency and temperature range where damping is required (typically about 1–10,000 Hz and −60 to about 100° C., more typically about 50–5,000 Hz and about 0–100° C., and most typically about 50–1500 Hz and about 20–80° C.). This loss factor is a measure of the material's ability to dissipate energy and depends on the frequency and temperature experienced by the damping material. For example, for a crosslinked acrylic polymer at a frequency of 100 Hz, the loss factor at 68° F. (20° C.) is about 1.0, while at 158° F. (70° C.), the loss factor is about 0.7.

Preferred viscoelastic materials are those that remain functional over a wide range of temperatures, e.g., about −40° C. to about 300° C. Most preferred viscoelastic materials are those that cover the broadest temperature and frequency range at the desired minimum loss factor and storage modulus to achieve acceptable damping of the spacer article and that do not experience a significant degradation in properties due to long times at high temperatures or short excursions beyond these high temperature levels.

Useful viscoelastic damping materials can be isotropic as well as anisotropic materials, particularly with respect to elastic properties. As used herein, an "anisotropic material" or "nonisotropic material" is one in which the properties are dependent upon the direction of measurement.

Suitable viscoelastic materials include urethane rubbers, silicone rubbers, nitrile rubbers, butyl rubbers, acrylic rubbers, natural rubbers, fluorine-based elastomers and rubbers, styrene-butadiene rubbers, synthetic rubbers, and the like. Other useful damping viscoelastic materials include acrylates, epoxy-acrylates, silicones, acrylate-silicone mixtures, cyanate esters, polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Specific examples of useful materials are disclosed or referenced in U.S. Pat. No. 5,183,863; U.S. Pat. No. 5,262,232; and U.S. Pat. No. 5,308,887. Particularly preferred viscoelastic damping materials are those based on acrylates.

Examples of thermoplastic materials suitable for use as the vibration damping material include, but are not limited to, those selected from the group consisting of polyacrylates, polycarbonates, polyetherimides, polyesters, polysulfones, polystyrenes, acrylonitrile-butadiene-styrene block copolymers, polypropylenes, acetal polymers, polyamides, polyvinyl chlorides, polyethylenes, polyurethanes, and combinations thereof.

Useful viscoelastic materials can also be crosslinkable to enhance their strength and/or temperature resistance. Such viscoelastics are classified as thermosetting resins. When the viscoelastic material is a thermosetting resin, then prior to the manufacture of the spacer article, the thermosetting resin is in a thermoplastic state. During the manufacturing process, the thermosetting resin is cured and/or crosslinked typically to a solid state, although it could be a gel upon curing, as long as the cured material possesses the viscoelastic properties described above. Depending upon the particular thermosetting resin employed, the thermosetting resin can include a curing agent, e.g., catalyst, which, when exposed to an appropriate energy source (such as thermal energy), the curing agent initiates polymerization of the thermosetting resin.

The vibration damping material can optionally include additives such as fillers (e.g., talc, etc.), colorants, toughening agents, fire retardants, antioxidants, antistatic agents, and the like. The vibration damping material can optionally contain fibers and/or particulates additives that are designed to provide an increased thermal and/or electrical conductive path through the vibration damping material. These materials may also add force retention improvements to a spacer article, but are not required. Sufficient amounts of each of these materials can be used to effect the desired result. The vibration damping material of the particulate/fiber containing spacer articles includes particulates and/or fibers. The other spacer articles described herein may optionally include such fibers and/or particulates in their vibration damping material.

A conductive material can be added to the vibration damping material to lower the electrical resistance of the viscoelastic layer between substrates and reduce the bias level to an acceptable level. The resistance level is effectively reduced if a sufficient amount of an electrically conductive material is added such that the resistance level between substrates (such as substrate layers) of the spacer article is below about 200 ohms, preferably below about 100 ohms, more preferably less than about 5 ohms, and most preferably less than 0.1 ohms.

The vibration damping material is bonded to, laminated to, or otherwise joined to, at least one substrate. This may occur due to the properties of the vibration damping material itself or the spacer article may further comprise adhesive layer(s) that aid in bonding of the vibration damping material to the substrate.

The vibration damping material may optionally be secured into or onto the spacer article via tension, compression, mechanical interlocking, etc.

The vibration damping material that provides the significant portion of the damping may also include an effective amount of an epoxy resin dispersed within the damping material. The vibration damping material may include an amount of epoxy resin effective to improve the mechanical integrity of the spacer article. The epoxy resin material may have damping properties. An example of a suitable damping material incorporating an epoxy resin is disclosed in U.S. Pat. No. 5,262,232. Typically, the amount of epoxy resin incorporated into the vibration damping material would be about 0.5 to 95 weight percent, more typically about 5 to about 50 weight percent, based on the total weight of the vibration damping material.

The vibration damping material used for a high modulus vibration damping material containing laminate spacer article requires a very specific range of performance to function as both a damping material and also provide force retention in a spindle assembly. The viscoelastic material, as tested in a rheometer at 1 Hertz and between 25° C. and 80° C., has a storage modulus of greater than about 200,000 Pascals, a loss modulus of less than about 500,000 Pascals, and a loss factor of less than about 0.5, preferably less than about 0.4. Preferably, the viscoelastic material has a storage modulus of greater than about 200,000 Pascals, a loss modulus of less than about 400,000 Pascals, and a loss factor of between about 0.05 and about 0.5, more preferably between about 0.10 and about 0.45 at 1 Hz and 25–80° C.

The viscoelastic material preferably has sufficient internal strength (modulus) and chemical resistance to allow the laminate to be stamped, ground, machined, polished and cleaned to the desired design requirements (desired flatness of the spacer article, force retention, tolerances, cleanliness needs, etc.) without delamination or negative effects caused by the stamping, grinding, machining, cleaning, and polishing, or the fluids used in these processes. Preferably the spacer article demonstrates low outgassing (less than about 25 $\mu g/cm^2$ total) and low ionic levels (less than about 100 $\mu g/cm^2$ total).

The laminate spacer articles (plastically deformed, high modulus, particulate/fiber, two section spacer, etc.) that have a vibration damping material layer between substrates may allow an electrical bias to develop between rotating storage articles and other rotating storage articles and/or read and write devices (such as magneto-resistive heads of a rigid disk drive) and/or drive covers and bases and also either substrate side of the laminate spacer article themselves. The substrates of the spacers, rotating storage articles, cover, and/or spindle may not make a good electrical connection due to tolerances and design of the spindle assembly and drive, leading to an electrical bias between various items noted. Furthermore, a typical vibration damping materials is non-conducting and may be a good electrical insulator. The electrical bias between various items can potentially lead to a degradation of the reading and writing performance of the drive and even lost data.

PRESS FIT LAMINATE SPACER ARTICLE

A press fit laminate spacer article is most typically prepared by first preparing a laminate as previously described. The laminate is prepared from an upper substrate layer, a lower substrate layer, and a layer of vibration damping material comprising a viscoelastic material laminated between said upper and lower substrate layers.

A substrate component (typically circular, although it may be oval, rectangular, etc.) having a through hole (typically centrally located and circular, although it may be oval, rectangular, etc.) therein is provided. The substrate component is typically ring-shaped. The substrate component has an inner perimeter and an outer perimeter. The substrate component may optionally have an inner perimeter and outer perimeter that is notched, jagged-edged, hatched, contains protrusions, etc. The substrate component has a higher storage modulus than the viscoelastic material in the vibration damping material.

The dimensions of the substrate component should be sufficient to allow press fitting of the substrate component onto the inner perimeter or outer perimeter of the laminate. Typically the through hole in the substrate component has the same shape as the outer perimeter of the laminate when the laminate fits within and is press fit into the substrate component. Typically the outer perimeter of the substrate component has the same shape as the inner perimeter of the laminate when the substrate component fits within the through hole of the laminate and is press fit into the laminate. The press fit clearance between the substrate component and the laminate is such that they may be closed upon each other and fit snugly, so as not to be easily displaced or moved apart once assembled. Such a spacer is typically similar in shape to that shown in FIG. 7.

Typically the thickness of the substrate component ranges from about 0.1 to about 10 mm, preferably about 0.5 to about 5 mm, and most preferably about 0.5 to about 3 mm. Typically the thickness of the substrate component is identical to the thickness of the laminate. If the substrate component is much thinner than the laminate, the desired force retention might not be obtained.

Typically the substrate component width in a partial cross-section is about 1–90% of the overall width of the press fit laminate spacer article partial cross-section, preferably from about 10–70%, and more preferably about 10–50%.

Preferably with respect to the above press fit laminate spacer article the thickness and position of the laminate is such that the laminate upper surface ranges from about 5 percent of the height of the substrate component below the upper surface of the substrate component to about 5 percent of the height of the substrate component above the substrate component. Also preferably, the laminate lower surface ranges from about 5 percent of the height of the substrate component above the lower surface of the substrate component to about 5 percent of the height of the substrate component below the lower surface of the substrate component. Even more preferably with respect to the above press fit laminate spacer article the thickness and position of the laminate is such that the laminate upper surface ranges from about 2 percent of the height of the substrate component below the upper surface of the substrate component to about 2 percent of the height of the substrate component above the substrate component. Also preferably, the laminate lower surface ranges from being about 2 percent of the height of the substrate component above the lower surface of the substrate component to about 2 percent of the height of the substrate component below the lower surface of the substrate component.

Preferably with respect to all the spacer articles of the invention, the spacer article has a force retention of at least about 92 percent (more preferably at least about 95 percent, even more preferably at least about 97 percent, and most preferably at least about 98.5 percent) of an initial compression force of $1.4 \times 10^6$ Pascals applied to the spacer article for about 0.2 to about 2 seconds at about 25° C. and at about 15 minutes after application of the initial compression force.

The spacer article may optionally further comprise a second laminate having a through hole therein that is press fit into the substrate component perimeter that the first laminate component is not press fit into.

Figure 6:
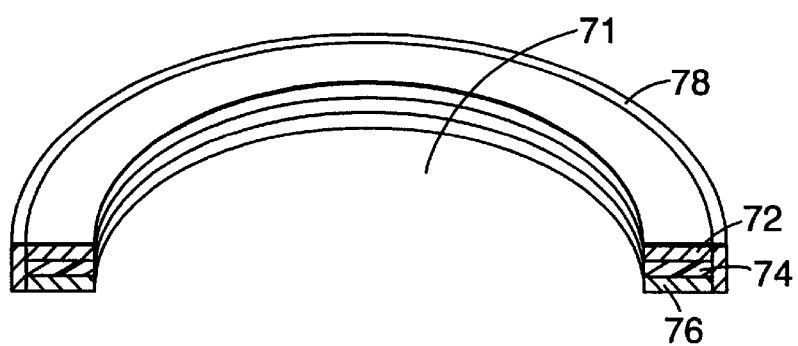
FIG. 6 illustrates a cross-sectional view of a spacer article of the present invention.

FIG. 6 illustrates a damped press fit laminate spacer article comprising a laminate comprising a first circular substrate layer 72 having a central through hole therein, a second circular substrate layer 76 having a central through hole therein, and a circular layer of vibration damping material 74 having a central through hole therein and positioned therebetween. The laminate is press fit into a ring-shaped substrate component 78. The spacer article encompasses a through hole 71.

NESTED SUBSTRATE SPACER ARTICLE

A nested substrate spacer article comprising a vibration damping material component positioned between a first substrate and a second substrate is most typically prepared as follows:

The first substrate may have a variety of shapes. It may be circular, oval, rectangular, etc. The outer perimeter of the first substrate may optionally be notched, jagged-edged, hatched, contain protrusions, etc. Typically the first substrate, as well as the other substrates, are ring-shaped. In a preferred embodiment of the nested substrate spacer article the first substrate is substantially ring-shaped, the second substrate is substantially ring-shaped, and the vibration damping material is substantially ring-shaped.

The first substrate has a through hole therein. Typically the through hole is circular in shape, although it may be oval, rectangular, etc. The area of the substrate defining the through hole may optionally be notched, jagged-edged, hatched, contain protrusions, etc. Typically the through hole is centrally located in the first substrate.

The first substrate has a storage modulus greater than that of the viscoelastic material in the vibration damping material. The first substrate typically has a diameter or length of about 1 mm to about 300 mm, preferably about 5 mm to about 100 mm, and most preferably about 10 to about 70 mm; a thickness of about 0.01 mm to about 25 mm, preferably about 0.05 mm to about 10 mm, and most preferably about 0.5 mm to about 5 mm; and a through hole diameter of about 0.9 mm to about 299.9 mm, preferably about 4.9 mm to about 99.9 mm, and most preferably about 9.9 mm to 69.9 mm.

A smaller diameter second substrate (typically circular in shape, although it may be oval, rectangular, etc.) is provided. The second substrate has a through hole therein. Typically the through hole is circular in shape, although it may be oval, rectangular, etc. The area defining the through hole may, optionally, be notched, jagged-edged, hatched, contain protrusions, etc. Typically the through hole is centrally located in the second substrate. The second substrate is positioned within the through hole of the first substrate. The outer perimeter of the second substrate may optionally be notched, jagged-edged, hatched, contain protrusions, etc.

The second substrate has a storage modulus greater than that of the viscoelastic material in the vibration damping material. The second substrate typically has a length or diameter of about 1 mm to about 300 mm, preferably about 5 mm to about 100 mm, and most preferably about 10 to about 70 mm; a thickness of about 0.01 to about 25 mm, preferably about 0.5 mm to about 10 mm, and most preferably about 1 mm to about 5 mm; and a through hole diameter of about 9.9 mm to about 299.9 mm, preferably about 4.9 mm to about 99.9 mm, and most preferably about 9.9 mm to 69.9 mm. Typically the thickness ratio of the first and second substrates ranges from about 1:1 to 1:20, preferably about 1:1 to about 1:5, even more preferably about 1:1 to about 1:1.5, and most preferably about 1:1.

A vibration damping material component (typically circular, although it may be oval, rectangular, etc.) comprising a viscoelastic material is provided between the two substrates, filling at least a portion of the gap between the two higher modulus substrates and contacting both substrates. The outer and/or inner perimeter of the vibration damping material component may optionally be notched, jagged-edged, hatched, contain protrusions, etc.

Vibration damping material is positioned within the through hole of the first substrate between the first substrate and the second substrate, such that it bonds the first substrate to the second substrate either mechanically and/or adhesively. The substrates are preferably off-set as defined previously herein.

The vibration damping material component typically has a partial cross-sectional thickness of about 0.001 mm to about 10 mm, preferably about 0.01 mm to about 5 mm, and most preferably about 0.025 mm to about 3 mm.

The vibration damping material component(s) may be continuous or discontinuous. A discontinuous component may be separated by space(s) and/or a nondamping material. A continuous component may comprise the same damping material or different damping materials adjacent to each other, thereby forming a continuous component.

Optionally, more than one vibration damping material component can be positioned between the first and second substrate rings. The substrates themselves may be continuous or discontinuous, with openings, slits, slots, protrusions, embossing features, coining features, etc. therein. The substrates, however, are typically continuous.

The spacer article may optionally further comprise additional substrate(s) separated by additional vibration damping material layers. For example, the spacer article may comprise an outer, middle, and inner substrate component that are joined by two vibration damping material components.

In a preferred embodiment of the nested substrate spacer article the height of the first substrate is within a range of about 95 percent of the height of the second substrate to about 105 percent of the height of the second substrate. In an even more preferred embodiment of the spacer article the first substrate and second substrate are about the same height. In a preferred embodiment of the nested substrate spacer article, the vibration damping material component is at least about 10 percent of the height of the first substrate beneath the upper surface of the first substrate and at least about 10 percent of the height of the first substrate above the lower surface of the first substrate; and wherein the vibration damping material component is at least about 10 percent of the height of the second substrate beneath the upper surface of the second substrate and at least about 10 percent of the height of the second substrate above the lower surface of the second substrate.

In an even more preferred embodiment of the nested substrate spacer article the vibration damping material component is at least about 15 percent of the height of the first substrate beneath the upper surface of the first substrate and at least about 15 percent of the height of the first substrate above the lower surface of the first substrate; and wherein the vibration damping material component is at least about 15 percent of the height of the second substrate beneath the upper surface of the second substrate and at least about 15 percent of the height of the second substrate above the lower surface of the second substrate.

In a preferred embodiment of the nested substrate spacer article the first substrate, vibration damping material component, and second substrate are positioned such that the first substrate and second substrate are offset from each other. More preferably the upper surface of the first substrate and the upper surface of the second substrate are offset from each other by about 0.025 to about 0.5 mm and wherein the lower surface of the first substrate and the lower surface of the second substrate are offset from each other by about 0.025 to about 0.5 mm. Most preferably the upper surface of the first substrate and the upper surface of the second substrate are offset from each other by about 0.025 to about 0.2 mm and wherein the lower surface of the first substrate and the lower surface of the second substrate are offset from each other by about 0.025 to about 0.2 mm.

Figure 33:
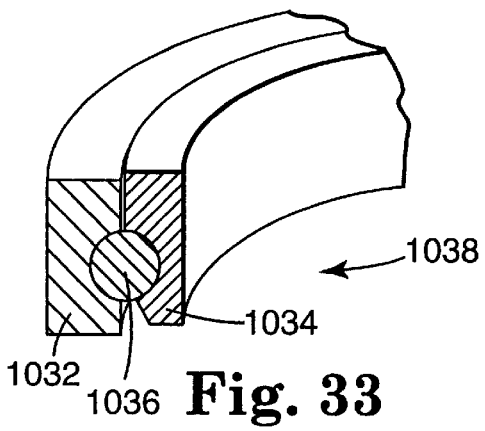

FIG. 33 illustrates a damped, nested substrate spacer article useful according to the present invention comprising a first substrate ring 1032 having an upper surface, a lower surface, an inner side and an outer side, wherein the inner side has a groove therein. The groove extends around the entire inner perimeter of the first substrate ring 1032. The first substrate ring 1032, which has a central through hole therein, is made, for example, of metal.

A second substrate ring 1034 has an upper surface, a lower surface, an inner side, and an outer side, wherein the inner side has a groove therein. The groove extends around the entire outer perimeter of the second substrate ring 1034. The second substrate ring 1034, which is made, for example of metal, has a central through hole therein.

A ring 1036 of vibration damping material is positioned within a cavity defined by the grooves. The spacer article encompasses a through hole 1038. Typically the height of each substrate ring (1032 and 1034) is substantially the same, more typically, the same.

Figure 34:
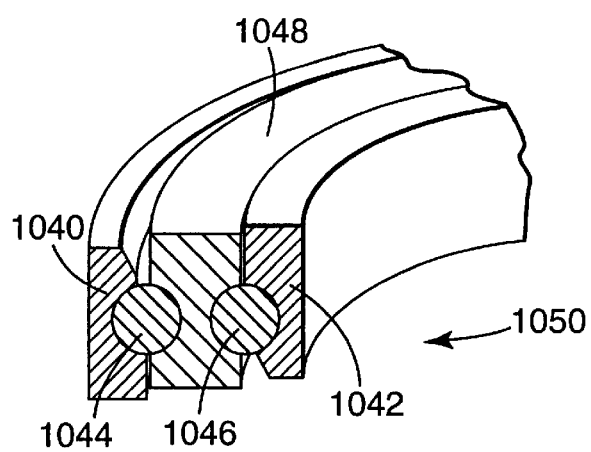

FIG. 34 illustrates a damped nested substrate spacer article useful according to the present invention comprising a first substrate ring 1040 having an upper surface, a lower surface, an inner side, and an outer side, wherein the inner side has a groove therein which extends completely around the entire inner perimeter of the first substrate ring 1040. The first substrate ring 1040, which has a central through hole therein, is made, for example of metal.

A second substrate ring 1048 having an upper surface, a lower surface, an inner side having a groove therein that extends completely around the inner perimeter of the second substrate ring 1048, and an outer side having a groove therein that extends around the entire outer perimeter of the second substrate ring 1048 is positioned within the through hole of the first substrate ring 1040. The second substrate ring 1048 has a central through hole therein and is made, for example, of metal.

A third substrate ring 1042 having an upper surface, a lower surface, an inner side, and an outer side having a groove therein that extends completely around the outer side is positioned within the through hole of the second substrate ring 1048.

A ring 1044 of vibration damping material is positioned within the grooves of the first 1040 and second 1048 substrate rings. A ring of vibration damping material 1046 is also positioned within the grooves of the second 1048 and third 1042 substrate rings.

In a preferred embodiment of the spacer article, at least about 25 percent of the surface area of the vibration damping material 1044, 1046 is in contact with the grooves. In an even more preferred embodiment of the spacer article, at least about 50 percent of the surface area of the vibration damping material 1044, 1046 is in contact with the grooves. In a most preferred embodiment of the spacer article, at least about 70 percent of the surface area of the vibration damping material 1044, 1046 is in contact with the grooves. In a most preferred embodiment of the spacer article, the first substrate ring 1040 and second substrate ring 1048 are within at least about 0.254 mm of each other and at least about 85% of the surface area of the vibration damping material 1044 fits entirely within a cavity defined by the groove in the first substrate ring 1040 and the groove in the second substrate ring 1048.

The spacer article encompasses a through hole 1050. Typically the height of each substrate ring (1040, 1048, and 1042) is substantially the same, more typically, the same. It is possible for this spacer article to comprise additional substrates and vibration damping material as discussed with respect to previous embodiments.

WELDED SPACER ARTICLE

A welded spacer article of the present invention is most typically prepared by first preparing a laminate from an upper substrate layer, a lower substrate layer, and a layer of vibration damping material comprising a viscoelastic material positioned between said upper and lower substrate layers.

The laminate can be spot welded, for example with a welding gun, such that the first substrate layer is welded to the second substrate layer. The outer periphery of the laminate can be welded such that the first substrate layer is welded to the second substrate layer. Alternatively, or in addition, the area of the spacer article that defines the through hole (the inner periphery of the laminate) may contain welds such that the first substrate is welded to the second substrate.

The number of welds can vary. One long weld, for example, may be employed which encompasses a perimeter (inner or outer) of the article. More typically, several welds (2 to 8, for example, more typically 4 to 8) that are smaller in size are employed.

A single weld typically comprises about 0.5 to about 100 percent, preferably about 0.5 to about 50 percent, and most preferably about 0.5 to about 25 percent of the length of the laminate perimeter on which the weld is present. Shorter welds are preferred due to ease of manufacturing.

Preferably the welds are symmetrically positioned and are positioned about the inner, outer, or both the inner and outer perimeters of the spacer article. Welds can potentially be made in areas between the inner and outer perimeter of the spacer, preferably within an area that is about 25 percent of the partial cross-sectional width of the spacer article from an inner and/or outer perimeter of the spacer article.

Figure 3:
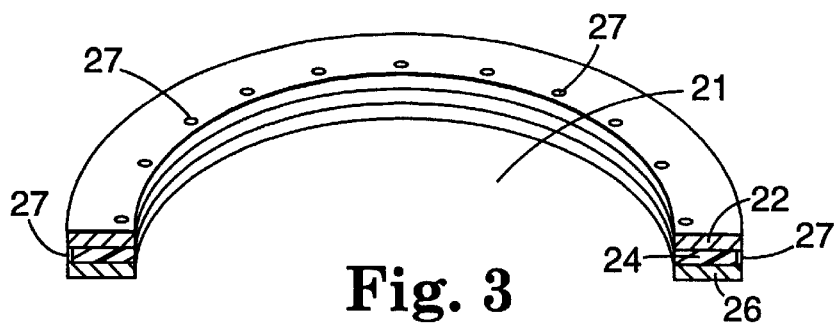
FIG. 3 illustrates a cross-sectional view of another embodiment of a spacer article of the present invention.

FIG. 3 illustrates a cross-sectional view of a welded, ring-shaped spacer article of the present invention. The ring-shaped upper substrate layer is identified as 22 and the lower ring-shaped substrate layer is identified as 26. The ring-shaped vibration damping material layer positioned therebetween is identified as 24. The first substrate layer 22 is welded to the second substrate layer 26 via welds 27. The spacer article encompasses a through hole 21.

PARTICULATE/FIBER CONTAINING SPACER ARTICLE

A particulate/fiber containing spacer article of the invention is most typically prepared by preparing a laminate from an upper substrate layer, a lower substrate layer, and a layer of vibration damping material comprising a viscoelastic material positioned between said upper and lower substrate layers. The layer of vibration damping material further comprises an additive selected from the group consisting of fibers, particulate, and mixtures thereof. The total amount of additive is about 1 to about 95 weight % based upon the total weight of the vibration damping material. The particulate size ranges from about 0.05% to about 125% of the average thickness of the vibration damping material layer in which the particulate is present. The fiber diameter ranges from about 0.05% to about 125% of the average thickness of the vibration damping layer in which the fiber is present. The load bearing capacity of the additive is at least about 100 psi (0.69 MPa).

Figure 2:
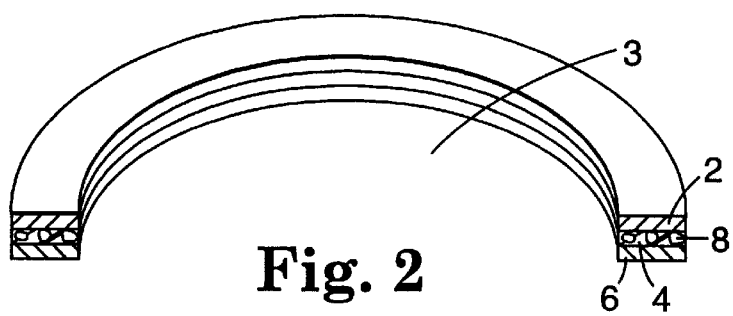
FIG. 2 illustrates a cross-sectional view of the spacer article of FIG. 1.

An example of such a spacer article is that shown in FIGS. 1 and 2. FIG. 1 illustrates a top view of a spacer article of the present invention. The upper circular substrate layer having a central through hole 3 therein is identified as 2. FIG. 2 illustrates a cross-sectional view of the particulate containing spacer article of FIG. 1. The upper substrate layer is identified as 2 and the lower substrate layer is identified as 6. The vibration damping material layer is identified as 4 and the particulate present therein is identified as 8. The spacer article encompasses a through hole 3.

Useful fibrous material can be, for example, in the form of fibrous strands or in the form of a fiber mat or web, although fibrous strands are preferred. The fibrous strands can be in the form of threads, cords, yarns, filaments, etc., as long as the viscoelastic material can wet the surface of the material. They can be dispersed randomly or uniformly in a specified order.

Preferably, the fibrous strands, i.e., fibers or fine thread-like pieces, have an aspect ratio of at least about 2:1, and more preferably an aspect ratio within a range of about 2:1 to about 10:1. The aspect ratio of a fiber is the ratio of the longer dimension of the fiber to the shorter dimension.

Examples of useful fibrous materials include, but are not limited to, nonmetallic fibrous materials, such as fiberglass, glass, carbon, minerals, synthetic or natural heat resistant organic materials, ceramic materials, and the like and metallic fibrous materials, such as steel, stainless steel, copper, aluminum, gold, silver, lead, titanium, and their alloys and the like. Generally, high Young's modulus fibrous materials, i.e., those having a modulus of at least about 100,000 psi ($6.9 \times 10^8$ Pascals), are preferred.

Useful natural organic fibrous materials include, but are not limited to, those selected from the group consisting of wool, silk, cotton, and cellulose. Examples of useful synthetic organic fibrous materials include, but are not limited to, those selected from the group consisting of polyvinyl alcohol, nylon, polyester, rayon, polyamide, acrylic, polyolefin, aramid, and phenol. The preferred organic fibrous material for applications of the present invention is aramid fibrous material. Such materials are commercially available from Dupont Co., Wilmington, Del. under the trade names "Kevlar" and "Nomex."

Generally, any ceramic fibrous material is useful in applications of the present invention. An example of a ceramic fibrous material suitable for the present invention is available under the trade designation, NEXTEL, which is commercially available from Minnesota Mining and Manufacturing Co.; St. Paul, Minn. Examples of useful, commercially available, glass fibrous materials are those available from PPG Industries, Inc.; Pittsburgh, Pa., under the product name E-glass bobbin yarn; Owens Coming; Toledo, Ohio, under the product name "Fiberglass" continuous filament yarn; and Manville Corporation; Toledo, Ohio, under the product name "Star Rov 502" fiberglass roving.

Advantages can be obtained through use of fibrous materials of a length as short as about 100 micrometers. The fibers are not limited in length, but much longer fibers may provide insufficient fiber interface and, therefore, decreased shearing surfaces between fibers. The fiber thickness or diameter for typical fibrous material ranges from at least about 5 micrometers. The thinner the fiber, the higher the surface area of the fibrous material for a given amount of fiber loading. Thus, preferred fibrous materials are very thin. The thickness of the fiber is also dependent upon the desired thickness of the overall damping material layer that will be used in the article. Thus, many common fibers may not be suitable if the overall damping material thickness is relatively thin (e.g., 4–10 micrometers).

Particulate material(s) useful in a spacer article can be in the form of bubbles or beads, flakes, powders, etc., as long as the viscoelastic can wet the surface of the material. Preferably, the particulate material is on the size order of about 0.1 to about 5 micrometers and more preferably about 0.1 to about 2 micrometers. Examples of useful particulate materials in applications of the present invention include metal; coated or uncoated glass and ceramic bubbles or beads; powders, such as silica, aluminum oxide powder and aluminum nitride power; cured epoxy nodules; and the like.

Fibers and/or particulates of the right composition, size, and loading can provide the desired force retention in the spacer article. The other spacer articles described herein have their force retention increased by other means, although the use of such fibers and/or particulate would not hinder their force retention and could potentially improve it. The fibers and/or particulates may provide a high modulus mechanical force connection through the damping material and to the substrate layers, in effect, bypassing or bridging the damping material and creating a mechanical connection that can support the attachment device's force with stress relaxation less than that of the damping material. When a force is applied, the force between substrate layers can pass through the particulates and/or fibers that connect both substrate surfaces to provide reduced damping viscoelastic stress relaxation. The fibers and/or particulate can be used in an amount to optimize force retention.

The total amount of such particles and/or fibers included in the vibration damping material typically ranges from about 1 to about 95%, preferably about 20 to about 90%, and most preferably about 50 to about 90%, based on the total weight of the vibration damping material. The fiber diameters for fibers for such a purpose typically range from about 0.05 to about 125%, preferably about 10 to about 100%, and most preferably about 50 to about 100%, based on the average thickness of the vibration damping layer in which the fibers are contained. The particle size for particles for such purposes typically ranges from about 0.05 to about 125%, preferably about 10 to about 100%, and most preferably about 50 to about 100%, based on average thickness of the vibration damping layer in which the particles are contained.

The fibers and/or particulates will provide a high modulus mechanical force connection through the damping material and between the substrate layers, in effect, completely or partially bypassing or bridging the damping material and creating a mechanical connection that can support the attachment device's force, and/or stress, and/or pressure, with stress relaxation less than that of the vibration damping material. When a fastener device is applied, the force between substrate layers can pass through the particulates and/or fibers that connect both substrate surfaces to provide reduced stress relaxation as the damping material is bypassed. The fibers and/or particulates can be used in an amount to optimize fastener device force retention. Depending on size and loading used, the damped spacer article's effectiveness as a damping system may be reduced somewhat. The useful modulus of the fibers and particulates is greater than about 690,000 Pascals, preferably greater than about 6,900,000 Pascals, and most preferably greater than about 70,000,000 Pascals.

BACK-TO-BACK SPACER ARTICLE

A back-to-back spacer article of the invention can be prepared by providing two spacer sections and positioning them back-to-back (i.e., second surface of one base to the second surface of the other base). Optionally, the bases can interlock. An advantage of such a back-to-back spacer article is the ability to provide a spacer article in which damping material is in contact with rotatable storage articles both above and below the spacer article, but allowing the ability to remove one rotatable storage article that is in contact with the vibration damping material of a spacer section without removing the other spacer section of the spacer article. The back-to-back spacer embodiment allows the disk drive assembly to be disassembled easily so that replacement components can be added and re-assembled. Since the rotatable storage article can become bonded to the vibration damping material, if this spacer article was not designed to separate into two pieces one could potentially end up with two rotable storage articles bonded together with one spacer article, which could make rework difficult.

This back-to-back design can also provide improved thermal shift and balancing of components in the disk drive assembly, as each rotatable storage article/spacer assembly is allowed to float somewhat between back-to-back spacers. This allows balancing of the disk drive assembly more easily during assembly. Higher RPM drives (greater than 7000 RPMs) need a well balanced spindle assembly to ensure high reliability and good drive read and writing performance. Thermal shift between components can also be enhanced as two disks are not directly connected via a solid spacer, thus allowing thermal shifting to occur more easily and with less impact on other components.

The present invention also provides for a back-to-back spacer article wherein for each spacer section the base is substantially in the shape of a ring, the ring having an inner edge and an outer edge, and wherein the substrate has two sides, wherein one side is in the form of a ring and is joined to the first surface of the base at about the inner edge of the base and the second side is in the form of a ring and is joined to the first surface of the base at about the outer edge of the ring in order to form a channel and the vibration damping material is at least partially contained within the channel.

Preferably each substrate section of a back-to-back spacer article is substantially in the shape of a ring. Preferably the second surfaces of the bases of both spacer sections are interlocking.

Each spacer section comprises a substrate and vibration damping material, wherein the substrate comprises a base having a first surface and a second surface and at least one side joined to the first surface of the base. When two or more sides are joined to the first surface of the base they may be joined in a manner as to form a channel in which the vibration damping material can be situated.

Each substrate can be of a one-piece construction or multiple-piece (typically two-piece if multiple-piece) construction. A one-piece construction may have a partial cross-sectional shape of an angular sideways C, L or E, for example. A multiple-piece construction (such as a two-piece construction) may have overlapping, adjoining, interlocking, connecting, slotted, screw-shaped, angled, flat-backed, etc. pieces that together form the substrate. An adhesive composition, adhesive tape, friction, a mechanical locking mechanism or other method of attachment may be used, if necessary, in order to hold the separate pieces of a multiple-piece construction in position to form the substrate.

Vibration damping material is bonded to the first surface of the substrate base. Each spacer section itself, as well as the resultant spacer article, encompasses a through hole, most typically a circular, centrally positioned through hole.

In a preferred embodiment, the vibration damping material extends beyond the highest substrate side. The vibration damping material is preferably extended in this manner to ensure the greatest likelihood of partial or full contact of the exposed vibration damping material with the rotatable storage article in contact with the spacer article as part of a disk drive assembly. The exposed vibration damping material serves to damp the rotatable storage article it is in contact with. However, it is not absolutely necessary that the vibration damping material extend beyond the highest side of a substrate since, due to the vibration of the rotatable storage article adjacent to the spacer article in a disk drive assembly, the rotatable storage article may still be able to contact the vibration damping material.

Figure 24:
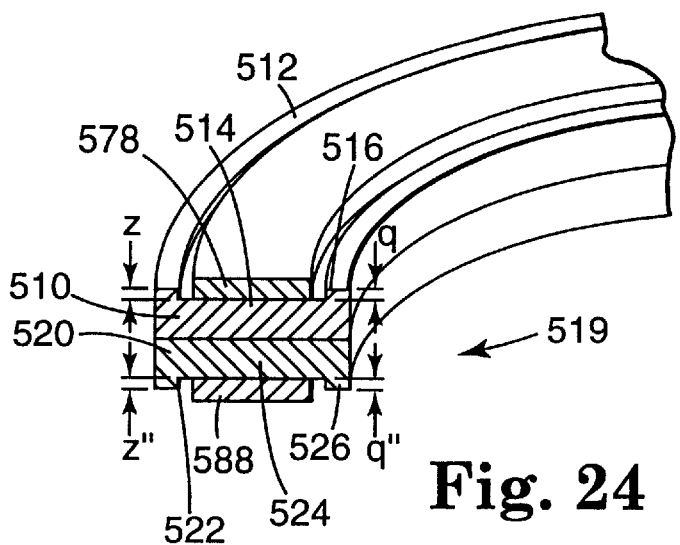

FIG. 24 is an embodiment of the back-to-back spacer article of the invention. One spacer section comprises a substrate 510 and a vibration damping material 578 comprising a viscoelastic material. The substrate 510 comprises a side 512 (having a height "z"), a side 516 (having a height "q"), and a base 514. The two sides 512 and 516 and base 514 are joined together such that they form a channel. The substrate is a one-piece construction having an angular sideways "C" shaped configuration in partial cross-section. The vibration damping material 578 is contained within the channel and extends above both substrate sides (512 and 516). An upper surface of the vibration damping material 578 present in the channel is completely exposed. The spacer article encompasses a through hole 519.

A second spacer section comprises a substrate 520 and a vibration damping material 588 comprising a viscoelastic material. The substrate 520 comprises a side 522 (having a height "z"), a side 526 (having a height "q"), and a base 524. The two sides 522 and 526 and base 524 are joined together such that they form a channel. The substrate is a one-piece construction having an angular sideways "C" shaped configuration in partial cross-section. The vibration damping material 588 is contained within the channel and extends beyond both substrate sides (522 and 526). An upper surface of the vibration damping material 588 present in the channel is completely exposed.

The two spacer sections are positioned base 514 to base 524.

Figure 25:
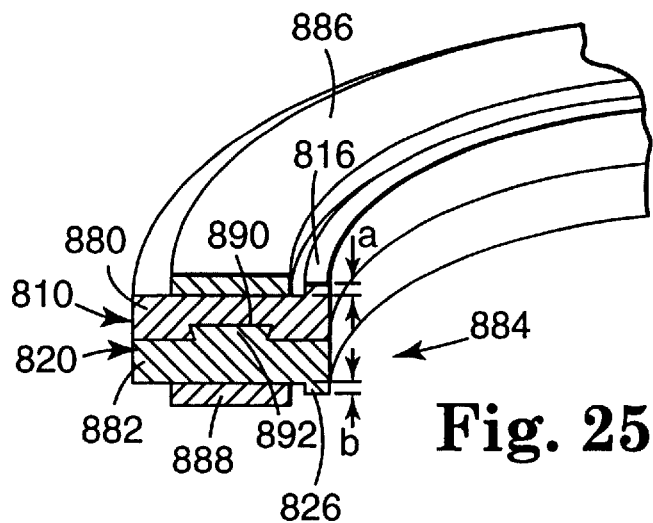

FIG. 25 is another embodiment of the back-to-back spacer article of the invention. One spacer section comprises a substrate 810 and a vibration damping material 886 comprising a viscoelastic material. The substrate 810 comprises one side 816 (having a height "a") and a base 880. The side 816 and the base 880 are joined together. The substrate 810 is a one-piece construction having a modified angular sideways "L" shaped configuration in partial cross-section. The vibration damping material 886 is contained within the channel and is bonded to the first surface of the base 880. The vibration damping material 886 also extends above the substrate side 816. An upper surface of the vibration damping material 886 present in the channel is completely exposed. The spacer article encompasses a through hole 884.

A second spacer section comprises a substrate 820 and a vibration damping material 888 comprising a viscoelastic material. The substrate 820 comprises one side 826 (having a height "b") and a base 882. The side 826 and base 882 are joined together such that they form a channel. The substrate 820 is a one-piece construction having a modified angular sideways "L" shaped configuration in partial cross-section. The vibration damping material 888 is contained within the channel and is bonded to the first surface of the base 882 and extends beyond the substrate side 826. An upper surface of the vibration damping material 888 present in the channel is completely exposed.

The two spacer sections are interlocking via their bases 880 and 882 due to a projection 892 in base 882 and a recession 890 in base 880.

Figure 26:
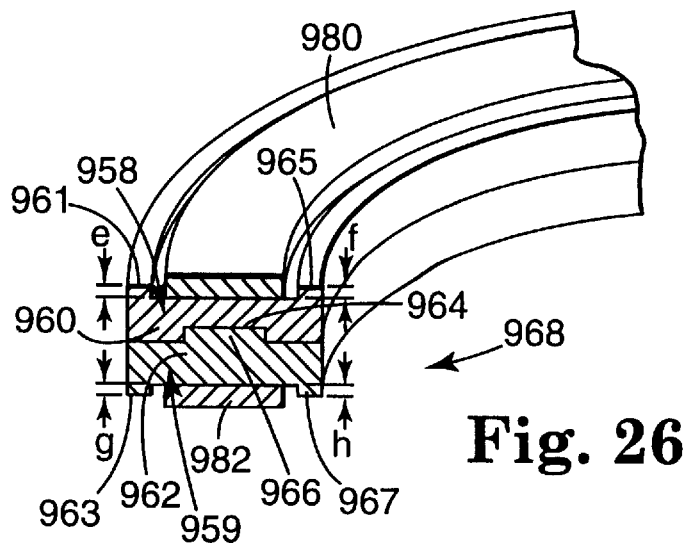

FIG. 26 is another embodiment of the back-to-back spacer article of the invention. One spacer section comprises a substrate 958 and a vibration damping material 980 comprising a viscoelastic material. The substrate 958 comprises a side 961 (having a height "e"), a side 965 (having a height "f"), and a base 960. The two sides 961, 965 and base 960 are joined together such that they form a channel. The substrate 958 is a one piece construction having a modified angular sideways "C" shaped configuration in partial cross-section. The vibration damping material 980 is contained within the channel and is bonded to the first surface of the base 960 and extends above both substrate sides (961 and 965). An upper surface of the vibration damping material 980 present in the channel is completely exposed. The spacer article encompasses a through hole 968.

A second spacer section comprises a substrate 959 and a vibration damping material 982 comprising a viscoelastic material. The substrate 959 comprises a side 963 (having a height "g"), a side 967 (having a height "h"), and a base 962. The two sides 963, 967 and base 962 are joined together such that they form a channel. The substrate 959 is a one-piece construction having a modified sideways angular "C" shaped configuration in partial cross-section. The substrate 959 has a higher storage modulus than the viscoelastic material in the vibration damping material 982. The vibration damping material 982 is contained within the channel and extends beyond both substrate sides 963 and 967. An upper surface of the vibration damping material 982 present in the channel is completely exposed.

The two spacer sections are interlocking via their bases due to a projection 966 in base 962 and a recession 964 in base 960.

The vibration damping material may optionally have a constraining layer attached to the surface thereof. This constraining layer could potentially contact the rotatable storage article on a spindle of a disk drive assembly and could, thus, reduce the possibility of vibration damping material bonding to the rotatable storage article. This constraining layer could also potentially improve the vibration damping performance of the spacer article. The vibration damping material and optional constraining layer may each optionally be segmented and may each optionally comprise more than one layer.

The vibration damping material width as compared to the width of the spacer article is typically from about 1–90% of the width of the spacer in a partial cross-sectional cut, preferably from about 10–90%, and most preferably from about 25–90%. The width of each of the sides of the spacer is typically from about 1–60% of the width of the spacer in a partial cross-section view, preferably from about 5–40%, and most preferably about 5%–25%.

The vibration damping material is typically positioned on the base such that it is positioned away from the sides by at least about 0.2% of the base width in a partial cross-sectional view of the base width away, preferably at least about 2% of the base width away, and most preferably at least about 4% of the base width away.

The ratio of the optional constraining layer thickness to an adjacent damping material layer thickness is typically about 1:0.05 to about 1:10, preferably about 1:0.2 to about 1:7, more preferably about 1:0.2 to about 1:5, and most preferably about 1:4 to about 1:2. The vibration damping material layer can also be provided so that it is undercut and does not extend past the edge of the constraining layer. For such an embodiment the damping material is preferably from about 0–25%, more preferably about 5–25%, and most preferably 10–25% of the constraining layer width from the edge of the constraining layer.

The vibration damping material has a height great enough such that it is about 90 to about 300 percent of the height of the highest substrate side of the spacer section, preferably 95–200%, more preferably 100–200%, more preferably 102–150%, and most preferably 102–120%.

The base of the spacer may optionally have cut-outs, recesses, notches, coins, depressions, etc. that the damping material can be squeezed into once the spacer is applied onto the spindle. This design can minimize the squeeze-out in an undesirable direction, such as out beyond the edge of the spacer. This design may also improve the force retention of the spacer article.

CONSTRAINED LAYER DAMPER SPACER ARTICLES

The present invention also provides a constrained layer damper spacer article comprising (a) a substrate, the substrate comprising (i) a base, the base having two major opposing surfaces, an upper surface and a lower surface, and (ii) at least one side joined to the upper surface of the base, each side having a height; and (b) a first constrained layer damper attached to the upper surface of the base. The first constrained layer damper has a height such that it ranges from about 90 to about 300 percent of the height of the side having a greatest height on the upper surface of the base. Each constrained layer damper independently comprises: (i) a constraining layer; and (ii) a layer of vibration damping material bonded to the constraining layer. The vibration damping material comprises viscoelastic material. The storage modulus of the constraining layer is greater than that of the viscoelastic material in the vibration damping material. Each constrained layer damper is attached to the base via its vibration damping material layer. The spacer article has a through hole therein.

Preferably the constrained layer damper spacer further comprises: (iii) at least one side joined to the lower surface of the base, each side having a height; and (c) a second constrained layer damper attached to the lower surface of the base, wherein the second constrained layer damper has a height such that it ranges from about 90 to about 300 percent of the height of the side having a greatest height on the lower surface of the base. The second constrained layer damper independently comprises: (i) a constraining layer; and (ii) a layer of vibration damping material bonded to the constraining layer. The vibration damping material comprises viscoelastic material. The storage modulus of the constraining layer is greater than that of the viscoelastic material in the vibration damping material. The storage modulus of the constraining layer is greater than that of the viscoelastic material in the vibration damping material. Each constrained layer damper is attached to the base via its vibration damping material layer.

Figure 27:
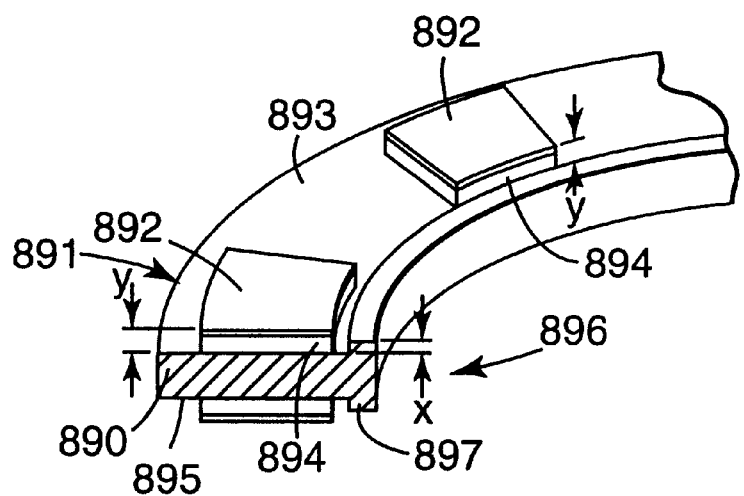

FIG. 27 illustrates a constrained layer damper spacer article of the invention. The spacer article comprises a ring-shaped substrate 891, the substrate 891 comprising a ring-shaped base 890, the base 890 having two major opposing surfaces, an upper surface 893 and a lower surface 895, and a ring-shaped side 897 joined to the upper surface 893 of the base 890, the side 987 (having a height "x") and several constrained layer dampers (each having a height "y") attached to the upper surface 893 of the base 890. The constraining layers described herein typically have the same properties and are made of the same materials as the previously described substrates.

Each constrained layer damper comprises a constraining layer 892 and a layer of vibration damping material 894 bonded thereto. Each constrained layer damper is attached to the upper surface 893 of the base 890 via its vibration damping material layer 894. The spacer article 891 has a through hole 896 therein.

Figure 28:
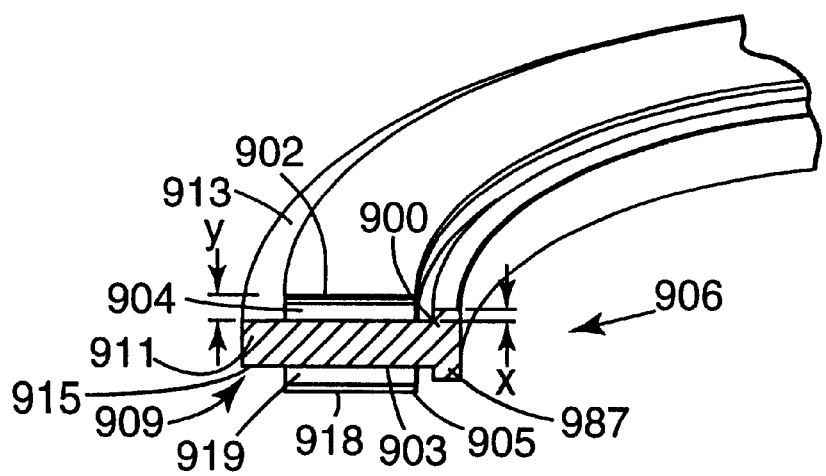

FIG. 28 illustrates a constrained layer damper spacer article. The spacer article comprises a ring-shaped substrate 909, the substrate 909 comprising a ring-shaped base 911 (the base 911 having two major opposing surfaces, an upper surface 913 and a lower surface 915) and a ring-shaped side 900 joined to the upper surface 913 of the base 911, the side 900 having a height (x) and a ring-shaped constrained layer damper having a height (y) attached to the upper surface 913 of the base 909. The constrained layer damper comprises a ring-shaped constraining layer 902 and a ring-shaped layer of vibration damping material 904 bonded thereto. The constrained layer damper is attached to the upper surface 913 of the base 909 via its vibration damping material layer 904.

A side 987 is also joined to the lower surface 915 of the base 909, the side 987 having a height (x). A second constrained layer damper is attached to the lower surface 915 of the base 909. The second constrained layer damper has a height (y). The second constrained layer damper comprises a constraining layer 918 and a layer of vibration damping material 919 bonded thereto. The spacer article has a through hole 906 therein.

The constrained layer damper width as compared to the width of the spacer article is typically from about 1–90% of the width of the spacer in a partial cross-section, preferably from about 10–75%, and most preferably from about 15–65%.

The width of the side of the spacer is typically from about 1–95% of the width of the spacer in a partial cross-section, preferably from about 10–75%, and most preferably about 20%–75%. The width of the side may affect the force retention of the spacer article. The width of a side may also affect the flatness of a rotatable storage article positioned adjacent to the spacer on a disk drive assembly. The constrained layer damper is preferably positioned onto the base such that it is positioned away from the side and does not hang over the base edge.

The ratio of the constraining layer thickness to an adjacent vibration damping material layer thickness is typically about 1:0.05 to about 1:10, preferably about 1:0.2 to about 1:7, more preferably about 1:0.2 to about 1:5, and most preferably 1:0.4 to about 1:2.

The vibration damping material layer can also be provided so that it is undercut and does not extend past the edge of the constraining layer. For such an embodiment, the damping material is preferably from about 0–25% of the constraining layer width from an edge of the constraining layer, more preferably about 5–25%, and most preferably 10–25% of the constraining layer width from the edge of the constraining layer.

The constrained layer damper attached to the upper surface of the base has a height such that it ranges from about 90 to about 300 percent of the height of the side having a greatest height on the upper surface of the base, preferably about 95–200%, more preferably about 100–150% and most preferably about 102–120%.

The base of the spacer may optionally lay at an angle to the side, from about 45–145 degrees, preferably from about 60–120 degrees, more preferably about 80 to 110 degrees, and most preferably about 80 to about 100 degrees. The angle can be used to improve shearing into the damping material.

The base of the spacer may optionally have cut-outs, recesses, notches, coins, depressions, etc. that the damping material can be squeezed into once the spacer is applied onto the spindle. This design can minimize the squeeze-out in an undesirable direction, such as out beyond the edge of the constraining layer, which could allow the damping material to contact the rotatable storage article, which may be detrimental to the drive function. This design may also result in a spacer article with improved force retention.

In a preferred embodiment, the first constrained layer damper has a height of about 0.01 to about 0.5 mm (more preferably about 0.01 to about 0.25 mm, and most preferably about 0.2 to about 0.1 mm) greater than the height of the side having the greatest height on the upper surface of the base. The second constrained layer damper has a height of about 0.01 to about 0.5 mm (more preferably about 0.01 to about 0.25 mm, and most preferably about 0.2 to about 0.1 mm) greater than the height of the side having the greatest height on the lower surface of the base.

TWO SECTION SPACER ARTICLE

The present invention also provides a two section spacer article comprising: (a) two substrate sections which are identified as a first substrate section and a second substrate section and (b) a vibration damping material comprising viscoelastic material. The first substrate section has a through hole, a base and a side joined to the base that extends above and below the base. The side has a height and an upper surface and a lower surface. The side defines an outer perimeter of the first substrate section and the base defines an inner perimeter of the first substrate section.

The second substrate section has a through hole, a base and a side joined to the base that extends above and below the base. The side has a height and an upper surface and a lower surface. The base defines an outer perimeter of the substrate section and the side defines an inner perimeter of the substrate section. The second substrate section fits within the through hole of the first substrate section. The side of the first substrate section has a height that falls within a range of about 90 percent of the height of the side of the second substrate section to a height about 110 percent of the height of the side of the second substrate section.

The storage modulus of the substrate sections are greater than that of the viscoelastic material in the vibration damping material. The two substrate sections are joined together via the vibration damping material laminated between the bases of the two substrate sections, such that upper surface of the side of the first substrate section is not greater than about 10%, more preferably 5%, of the height of the side of the second substrate section above the upper surface of the side of the second substrate section nor greater than about 10%, more preferably 5%, of the height of the side of the second substrate section below the upper surface of the side of the second substrate. The substrate sections are joined such that lower surface of the first substrate section is not greater than about 10%, more preferably 5%, of the height of the side of the second substrate section above the lower surface of the side of the second substrate section nor greater than 10%, more preferably 5%, of the height of the side of the second substrate below the lower surface of the side of the second substrate. The spacer article has a through hole therein.

Preferably the two section spacer article has a force retention of at least about 92 percent of an initial compression force of $1.4 \times 10^6$ Pascals applied to the spacer article for about 0.2 to about 2 seconds at about 25° C. at about 15 minutes after the application of the initial compression force.

Preferably, the upper surface of the side of the first substrate section is level with the upper surface of the side of the second substrate section and the lower surface of the side of the first substrate section is level with the lower surface of the side of the second substrate section. Preferably, each spacer section is substantially ring-shaped and the spacer article is substantially ring-shaped.

A two section spacer article is typically prepared as follows: Two substrate sections are provided. Each substrate section comprises a horizontal base and a vertical side joined together via their horizontal bases. The horizontal base and vertical side are typically perpendicular to each other. Vibration damping material is laminated between the horizontal bases of the two substrate sections. Each substrate section typically has a sideways "T" or "L" shape in partial cross-section. The height of each vertical projection is substantially the same, typically the same. The spacer is designed such that the force applied to the spacer from above passes through the vertical sides. The spacer article is also designed such that it encompasses a through hole.

Figure 18:
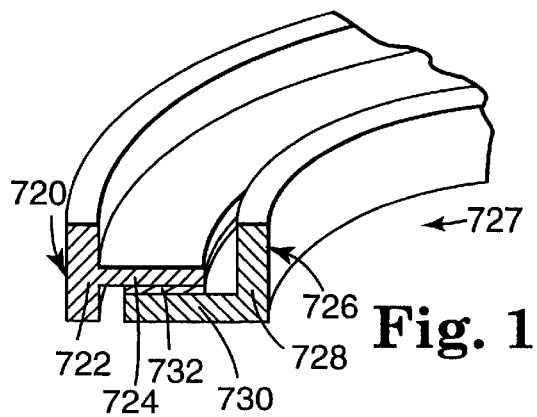

FIG. 18 discloses one embodiment of the two section spacer article of the invention. A laminate is prepared from a first substrate section 720 ("T"-shaped) and a second substrate section 726 ("L"-shaped). A layer of vibration damping material 732 comprising a viscoelastic material is positioned between said first 720 and second 726 substrate sections. The two substrate sections 720 and 726 are joined together via the vibration damping material 732. The T-shaped substrate section 720 comprises a horizontal base 724 and a vertical side 722 joined together. The L-shaped substrate section 726 comprises a horizontal base 730 and a vertical side 728 joined together. The vibration damping material 732 is laminated or otherwise positioned between the horizontal bases 724 and 730 of the two substrate sections 720 and 726. The height of each vertical side 722 and 728 is substantially the same. The spacer article encompasses a through hole 727.

Figure 19:
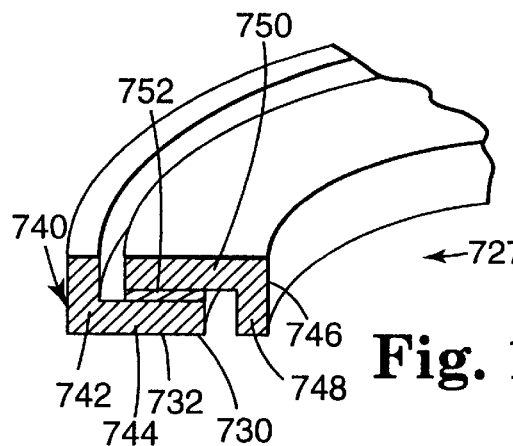

FIG. 19 discloses another embodiment of the two section spacer article of the invention. A laminate is prepared from a first substrate section 740 and a second substrate section 746. A layer of vibration damping material 752 comprising a viscoelastic material is positioned between said first 740 and second 746 substrate sections. The two substrate sections 740 and 746 are joined together via the vibration damping material 752. L-shaped substrate section 746 comprises a horizontal base 750 and a vertical side 748 joined together. L-shaped substrate section 740 comprises a horizontal base 744 and a vertical side 742 attached together. The vibration damping material 752 is laminated or otherwise positioned between the horizontal bases 744 and 750 of the two substrate sections 740 and 746. The height of each vertical projection 742 and 748 is substantially the same. The spacer article encompasses a through hole 727.

Figure 21:
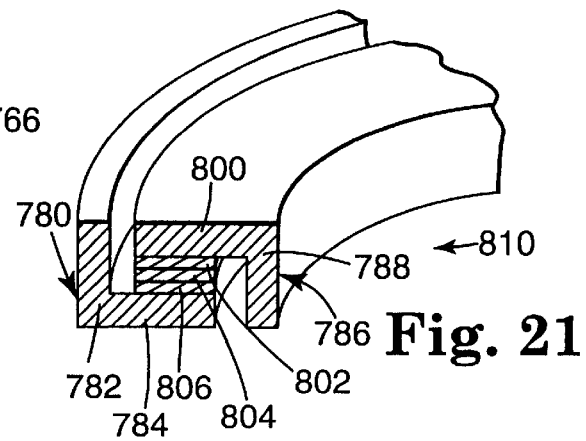

FIG. 21 discloses another embodiment of the two section spacer article of the invention. A laminate is prepared from a first substrate section 780 and a second substrate section 786. Two layers of vibration damping material 802 and 806 comprising a viscoelastic material are positioned between said first 780 and second 786 sections. The two substrate sections 780 and 786 are joined together via the vibration damping material layers 802 and 806 and an internal substrate layer 804. The L-shaped substrate section 780 comprises a horizontal base 784 and a vertical side 782 joined together. The other L-shaped substrate section 786 comprises a horizontal base 800 and a vertical side 788 joined together. The two substrate sections 780 and 786 are joined together via their horizontal bases 784 and 800. The vibration damping material 802 and 806 is laminated or otherwise positioned between the horizontal bases 784 and 800 of the two substrate sections 780 and 786. The height of each vertical side 782 and 788 is substantially the same. The spacer article encompasses a through hole 810.

U-SHAPED LAMINATE SPACER ARTICLE

A U-shaped laminate spacer article of the invention is typically prepared as follows:

A layer of vibration damping material is laminated between two substrate layers. The laminate is stamped, coined, embossed, molded or otherwise formed such that, in partial cross-section, the laminate has a configuration which is U-shaped (either right side up, upside down or sideways). The spacer article is designed such that it contains a through hole. The thickness of each substrate layer typically ranges from about 0.01 mm to about 10 mm, preferably about 0.3 mm to about 5 mm, and most preferably 0.3 mm to about 2 mm. The thickness of the vibration damping material typically ranges from about 0.001 mm to about 1 mm, preferably from about 0.01 mm to about 0.5 mm, and most preferably about 0.015 mm to about 0.25 mm. The laminate may optionally further comprise additional substrate and vibration damping material layers.

Figure 20:
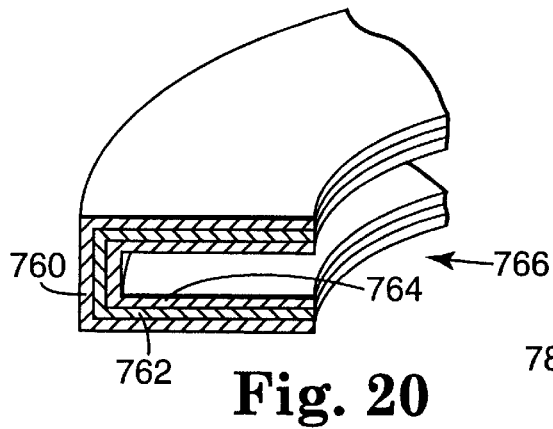

FIG. 20 is a cross-section of an embodiment of a U-shaped laminate spacer article of the invention. The spacer article comprises a laminate comprising a first substrate layer 760, a second substrate layer 764, and a layer of vibration damping material 762 laminated between the two substrate layers 760 and 764. The laminate has a configuration which is U-shaped and sideways in partial cross-section. The spacer article, which is ring-shaped, encompasses a through hole 766.

Figure 22:
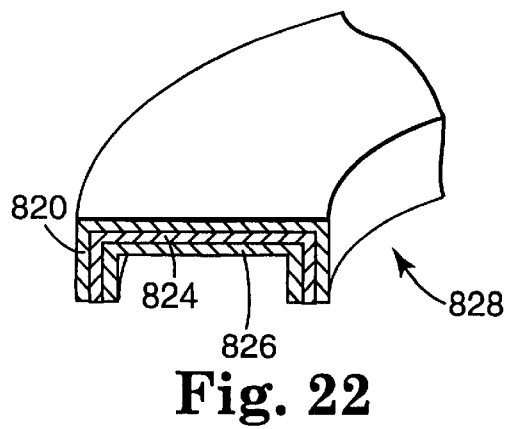

FIG. 22 is a cross-section of another embodiment of a U-shaped laminate spacer article of the invention. The spacer article comprises a laminate prepared from a first substrate layer 820, a second substrate layer 826, and a layer of vibration damping material 824 comprising a viscoelastic material laminated between said first 820 and second 826 substrate layers. The laminate has a configuration in partial cross-section which is U-shaped and upside down. The spacer article encompasses a through hole 828.

Figure 23:
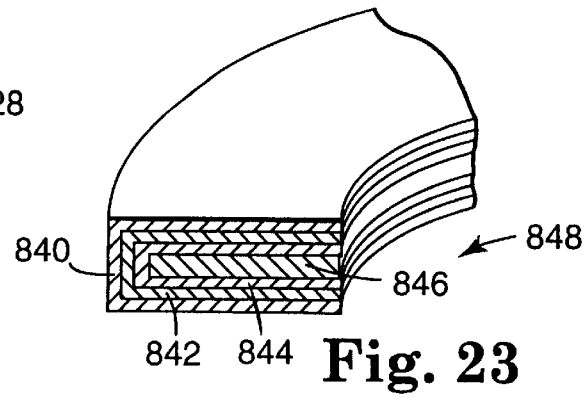

FIG. 23 is a cross-section of another embodiment of a U-shaped spacer article embodiment of the invention. The spacer article comprises a laminate prepared from a first substrate layer 840, a second substrate layer 844, and a layer of vibration damping material 842 comprising a viscoelastic material laminated between said first 840 and second 844 substrate layers. The layer of vibration damping material 842 is laminated between the two substrate layers 840 and 844 within the laminate. An additional vibration damping material layer 846 is positioned between the folded substrate layer 844. The laminate has a configuration which, in partial cross-section, is U-shaped and sideways. The spacer article encompasses a through hole 848.

U-SHAPED SPACER ARTICLE HAVING ONE SUBSTRATE LAYER

The present invention also provides a U-shaped laminate spacer article comprising:
- a laminate, wherein the laminate comprises: (a) two substrate layers; and (b) a layer of vibration damping material comprising viscoelastic material. The storage modulus of each substrate layer is greater than that of the viscoelastic material in the vibration damping material. The layer of vibration damping material is laminated between the two substrate layers within the laminate. The laminate has a configuration in partial cross-section which is U shaped. The spacer article has a through hole therein.

Preferably the spacer article has a force retention of at least about 92 percent of an initial compression force of $1.4 \times 10^6$ Pascals applied to the spacer article for about 0.2 to about 2 seconds at about 25° C. at about 15 minutes after the application of the initial compression force.

The present invention also provides a U-shaped spacer article having a substrate layer comprising: (a) a substrate, the substrate having a through hole, the substrate having a sideways U-shape in partial cross-section, the substrate comprising an upper base, a lower base, and a side joining the upper base and the lower base, and an internal cavity; and (b) vibration damping material comprising viscoelastic material. Preferably the substrate is substantially ring shaped and the vibration damping material is substantially ring-shaped. The storage modulus of the substrate is greater than that of the viscoelastic material in the vibration damping material. The vibration damping material is positioned within the cavity of the substrate such that it is contact with at least both the upper base and the lower base of the substrate. The spacer article has a through hole therein.

Figure 29:
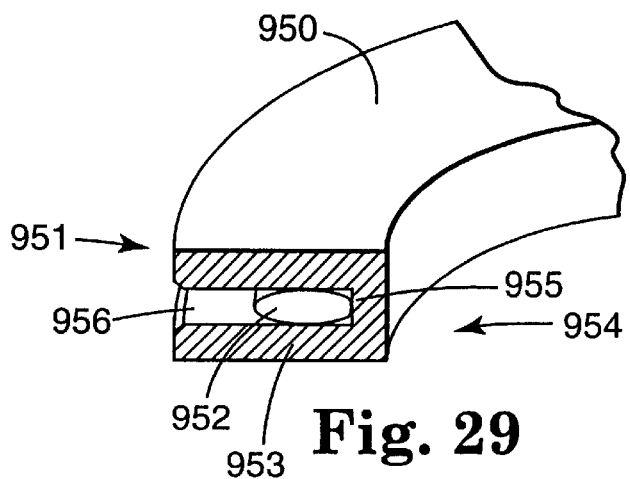

FIG. 29 illustrates one embodiment of a U-shaped spacer article having one substrate layer. The spacer article comprises a substrate 951, the substrate 951 having a through hole 954, the substrate 951 having a sideways U-shape in partial cross-section, the substrate 951 comprising an upper base 950, a lower base 953, and a side 955 joining the upper base 950 and the lower base 953, and the substrate having an internal cavity 956. A vibration damping material 952 comprising viscoelastic material is positioned within the cavity 956 of the substrate 951 such that it is in contact with at least both the upper base 950 and the lower base 953 of the substrate 951. The vibration damping material 952 may optionally also contact the side inside the cavity 956.

Figure 30:
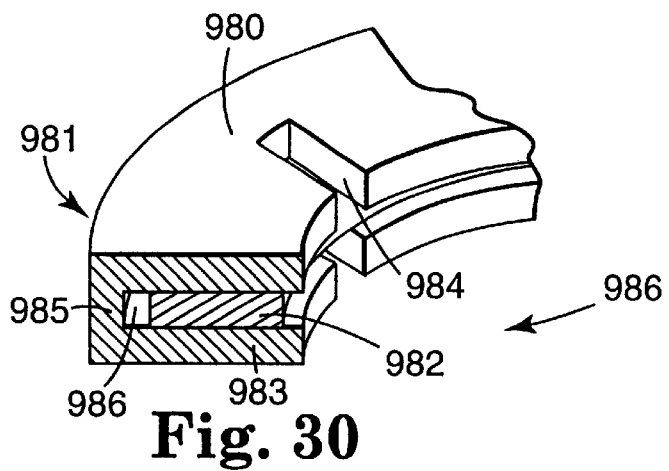

FIG. 30 illustrates another embodiment of a U-shaped spacer article having one substrate layer. The spacer article comprises a substrate 981, the substrate 981 having a through hole 986, the substrate 981 having a sideways U-shape in partial cross-section, the substrate 981 comprising an upper base 980, a lower base 983, and a side 985 joining the upper base 980 and the lower base 983, and the substrate having an internal cavity 986. A vibration damping material 982 comprising viscoelastic material is positioned within the cavity 986 of the substrate 981 such that it is in contact with at least both the upper base 980 and the lower base 983 of the substrate 981. The upper base 980 and lower base 983 each contain notches 984 therein. The notches 984 are positioned such that they are on the edge of the upper base 980 and lower base 983, which edges are not joined to the side 985. These notches 984 serve to increase the strain energy directed into the vibration damping material, which provides improved damping performance.

Figure 31:
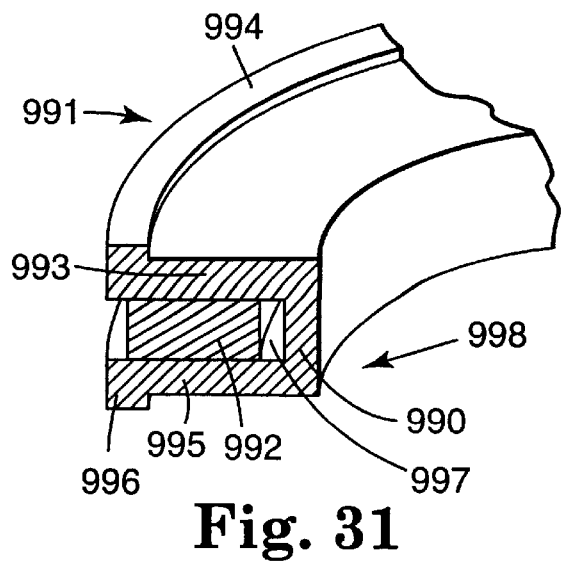

FIG. 31 illustrates another embodiment of a U-shaped spacer article having one substrate layer. The spacer article comprises a substrate 991, the substrate 991 having a through hole 998, the substrate 991 having a sideways U-shape in partial cross-section, the substrate 991 comprising an upper base 993, a lower base 995, and a side 990 joining the upper base 993 and the lower base 995, and the substrate 991 having an internal cavity 997. A vibration damping material 992 comprising viscoelastic material is positioned within the cavity 997 of the substrate 991 such that it is in contact with at least both the upper base 993 and the lower base 995 of the substrate 991. The upper base 993 and lower base 995 each contain projections 994 on the outer surface (the surface opposite those surfaces encompassing the cavity 997). The projections 994 are positioned such that they are on the edge of the upper base 993 and lower base 995, which edges are not joined to the side 990. These projections 994 serve to increase the strain energy directed into the vibration damping material, which provides improved damping performance.

The spacer article typically has an upper base and lower base that are of the same thickness, but they can differ. Typically, the upper and lower base each have a thickness that is from about 0.05% to about 40% of the spacer's overall thickness, preferably about 1% to about 30%, and most preferably about 1 to about 20%.

The side of the spacer article typically has a width of about 1–90% of the overall spacer's width when viewed in partial cross-section, preferably about 5–50%, and most preferably about 5–30%.

The vibration damping material portion (which may, for example, be round, square, rectangular or other geometric cross-section shape, and may be either continuous or discontinuous) contacts both bases. Typically, the vibration damping material is in the shape of a ring. The damping material is typically under some degree of compression and/or elongation and/or stretching which decreases its height by typically about 0.05–75% of its uncompressed/unelongated height, more typically about 1–25%, even more typically about 1–10%, and most typically by about 1–5% of its uncompressed and/or unelongated height. The vibration damping material in the cavity is compressed and/or elongated such that its height within the cavity is reduced by about 0.05 to about 75% of its initial uncompressed and/or unelongated height. The vibration damping material may be under tension and/or compression forces when it is fit into the cavity. The height of the vibration damping material may also be its partial cross-sectional thickness or width.

The vibration damping material can optionally be segmented, hatched, slotted, slit, notched, contain depressions, lips, edges, bevels, etc. to aid in the compression of the damping material for initial fitting into the spacer and also to increase its damping properties.

The vibration damping material may optionally be poured, molded, injected or dispensed into the cavity and optionally cured in place. Alternatively, the vibration damping material can optionally be pre-molded and mechanically fit into place within the cavity. The cavity can optionally have one or more damping materials placed into it.

The thinner the base layer, the more easily the base can be deflected by the rotatable storage article's vibration modes, allowing the vibration damping material under compression to be sheared and/or compression/tension deflected by the base layer movement and provide damping to reduce the rotatable storage article's vibrations.

The damping material is typically positioned such that less than about 50% of the damping material extends past the edge of the base or cavity, preferably less than about 10%, more preferably 0% and most preferably the damping material is from 1–20% of the base width when viewed in partial cross-section inside the cavity and away from the edge of the base. It is preferable that the damping material also contact the inside edge of the side within the cavity.

The spacer article prior to placement onto a spindle assembly may have an outward bow to the base(s) due to the vibration damping material design selected. The bow of the base may be overcome by the force used to hold the rotatable storage article and spacer article on the spindle. If present, the bow is typically less than about 20% of the spacer thickness, preferably less than about 10%, and most preferably less than about 5%.

HIGH MODULUS VIBRATION DAMPING MATERIAL CONTAINING LAMINATE SPACER ARTICLE

In another embodiment, the disk drive assembly of the invention utilizes a spacer article that contains a high modulus vibration damping material that is capable of providing the desired force retention. The present invention also provides disk drive assembly comprising: (a) a disk drive, the disk drive having a spindle; (b) a rotatable storage article positioned such that the spindle extends through a through hole in the rotatable storage article; (c) a high modulus vibration damping material containing laminate spacer article and (d) a means for securing the rotatable storage article and spacer article onto the spindle. The spacer article is positioned such that the spindle extends through a through hole in the spacer article. The spacer article is positioned adjacent to and in contact with the rotatable storage article. The spacer article comprises: a laminate having a through hole, the laminate comprising: (i) an upper substrate layer and a lower substrate layer; and (ii) a layer of vibration damping material comprising a viscoelastic material positioned between said upper and lower substrate layers. The viscoelastic material has a loss modulus of less than about 500,000 Pascals, a storage modulus greater than about 200,000 Pascals, and a loss factor of less than about 0.5 when measured at 1 Hertz and between 25 and 80° C. The storage modulus of each substrate layer is greater than that of the viscoelastic material in the vibration damping material layer. The spacer article has a force retention of at least about 92 percent of an initial compression force of $1.4 \times 10^6$ Pascals applied to the spacer article for about 0.2 to about 2 seconds at about 25° C. at about 15 minutes after the application of the initial compression force.

Figure 35:
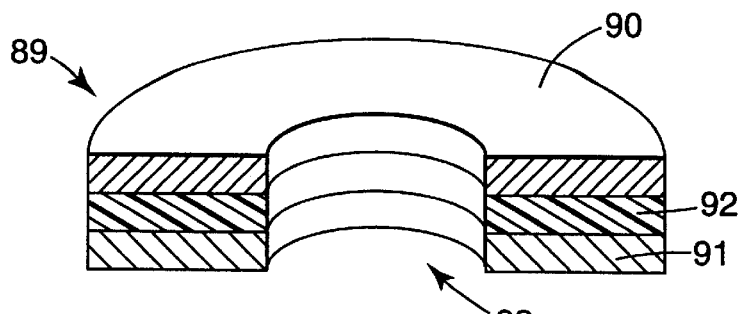
FIG. 35 illustrates a cross-sectional view of another embodiment of a spacer article useful in the disk drive assembly of the present invention.

FIG. 35 illustrates such a spacer article. The spacer article 89 comprises a laminate having a through hole 93, the laminate comprising an upper substrate layer 90, a lower substrate layer 91, and a layer of vibration damping material 92 comprising a viscoelastic material positioned between said upper 90 and lower 91 substrate layers.

The viscoelastic material has a loss modulus of less than about 500,000 Pascals, a storage modulus of greater than about 200,000 Pascals, and a loss factor of less than about 0.5 when measured at 1 Hertz and between 25–80° C. The storage modulus of each substrate layer 90 and 91 is greater than that of the viscoelastic material in the vibration damping material layer 92. The preferred viscoelastic material has a loss modulus of less than about 400,000 Pascals, a storage modulus of greater than about 250,000 Pascals, and a loss factor of between about 0.05 and about 0.45, more preferably a loss factor between about 0.1 and about 0.4, when measured at 1 Hertz and between 25–80° C. The properties of the viscoelastic material not only contribute to the force retention properties of the spacer article but can also affect the machining process. The aforementioned viscoleastic properties preferably provide sufficient internal strength to result in good machining, stamping, grinding, sanding, deburring, etc., characteristics. That is, these processes are more likely to occur without delamination of the laminate.

The spacer article design provides for a force retention of the spacer article of at least about 92%, preferably at least about 95% and most preferably about 97% of an initial force of $1.4 \times 10^6$ Pascals that is applied to the spacer article for a duration of about 0.2 to about 2 seconds at 25° C. for about 15 minutes after the application of the initial force.

PLASTICALLY DEFORMED SPACER ARTICLE

The present invention provides in one embodiment a damped laminate spacer article having at least one intended force application area on the laminate spacer article wherein the vibration damping material layer is less massive or nonexistent and one or more substrate layers are plastically deformed. Since the damping material is typically reduced or nonexistent only in the intended force application area(s), this allows a laminate spacer article to be optimally designed for the application in terms of vibration damping material thickness for control of resonant vibration or shock and also noise generation or transmission, plus for forming requirements the laminate spacer article may need to meet. The force application area(s) provide improved force retention upon application of a force from a rotatable storage article, another spacer article and/or an attachment device such as a clamp. Since the vibration damping layer is less massive or nonexistent only in a very small area, this does not significantly affect the overall design or effectiveness of the vibration damping spacer article.

A plastically deformed spacer article of the invention is most typically prepared as follows:

A laminate is prepared from an upper substrate layer, a lower substrate layer and a layer of vibration damping material comprising a viscoelastic material positioned between said upper and lower substrate layers. A deformation area is provided in the laminate, wherein a deformation area is an area of the spacer article wherein at least one substrate layer is plastically deformed such that at least two substrate layers are touching or positioned closer to each other than in an area of the spacer article in which none of the substrates are plastically deformed.

Preferably at least one substrate layer of the plastically deformed spacer article is selected from the group consisting of the first and second substrate layers has at least one of the following features selected from the group consisting of protrusions, recessions, bevels, indentations, ledges, coins, ridges and notches in at least one deformation area. Preferably at least one substrate layer has a variable thickness in a deformation area.

The deformation area is such that within at least a 0.5% area of the deformation area, the vibration damping material is non-existent or, if present, has a mass that is 90 percent or less, more typically 50 percent of less, and most typically about 25 percent or less than the average mass of the vibration damping material layer of an equal area in an area of the spacer article which is not in a deformation area. The deformation area has a surface area that is typically about 0.05 to about 90% of the surface area of the spacer article, preferably about 0.05% to about 50%, more preferably about 0.05% to about 30%, and most preferably about 0.05% to about 15%.

The deformation can be provided, as one example, by using an appropriate punch to deform the laminate by placing the laminate in a stamping press, for example, and impinging the punch directly above the through hole area of the laminate spacer article. The punch may, for example, deform the upper top surface of the laminate around the through hole such that the top surface of the upper substrate is plastically deformed such that it is angled in a direction towards the lower substrate. The deformation in the top substrate, thus, may be of a ring shape. An example of such a deformed spacer article is that shown in FIG. 4. As another example, the outer surface of the upper substrate may be plastically deformed such that it is angled towards the lower substrate. Alternatively, both the inner surface and the outer surface of the upper substrate may be deformed towards the lower substrate. Other patterns of deformation are possible in both the upper and/or lower substrate as long as the appropriate force retention is obtained.

Typically, an amount of the damping material is present such that the damping characteristics of the spacer article are improved over a non-laminate or monolithic spacer article as used in the same application, for example, as a disk spacer in a hard disk drive. Preferably, a sufficient amount of the vibration damping material is used such that the damping is improved by at least about 10% in at least one vibrational mode.

This laminate spacer article is then stamped out and stamped with various tools and dies that provide the needed part definition (embossing, blanking, forming, coining, sanding, deburring, grinding, etc.) The final laminated spacer article during this stamping process has holes pierced in it to provide a path for the disk drive spindle. The force application areas are further modified either before or after piercing with a tool punch to displace the vibration damping material, impart a deformation into the substrate layer(s) to reduce the vibration damping material's recovery and minimize residual spring effect between the substrate layers, to provide a deformed laminate spacer article with improved force and/or torque and/or pressure retention and preferably high damping performance in a disk drive assembly as compared to an identical non-laminate spacer article (improved damping) and also a laminate spacer article (improved force retention.)

Figure 4:
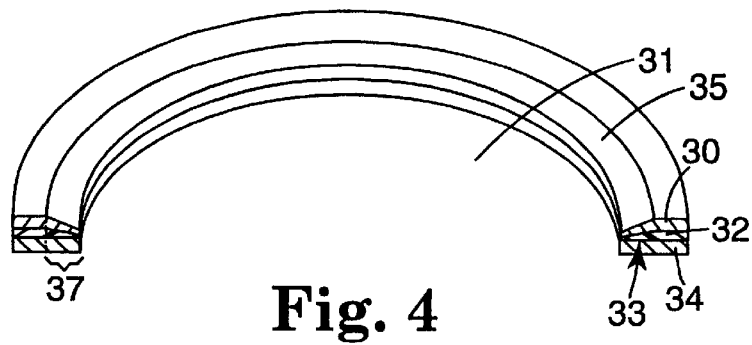
FIG. 4 illustrates a cross-sectional view of another embodiment of a spacer article of the present invention.

FIG. 4 illustrates a cross-sectional view of a ring-shaped deformed spacer article of the present invention. The upper substrate layer is identified as 30 and the lower substrate layer is identified as 34. The vibration damping material layer is identified as 32. A portion 35 of the upper substrate layer 30 surrounding a central hole 31 is plastically deformed such that it is closer to lower substrate layer 34. The deformation area is identified as 33.

Figure 13:
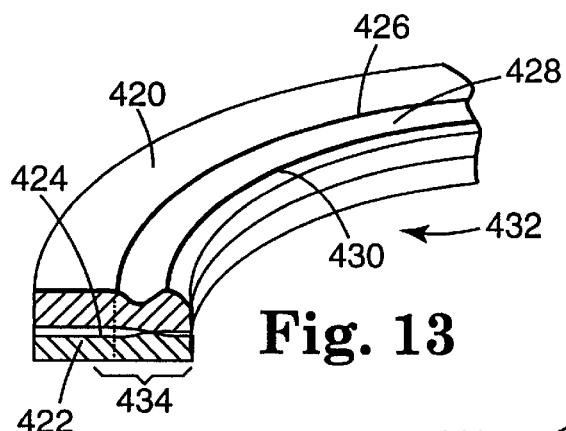
FIGS. 13–34 illustrate partial cross-sectional views of other embodiments of spacer articles of the present invention.

FIG. 13 is a partial cross-section of another embodiment of a ring-shaped deformed laminate spacer article of the invention comprising upper substrate layer 420, lower substrate layer 422, through hole 432, vibration damping material layer 424, deformation 428 and protrusions 430 and 426 of the upper substrate layer 420, and deformation area 434.

Figure 14:
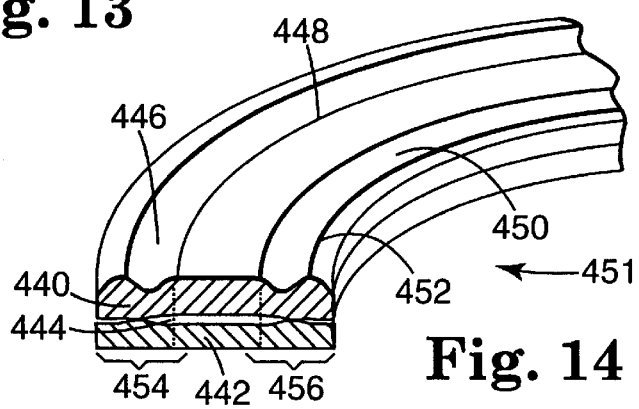

FIG. 14 is a partial cross-section of another embodiment of a ring-shaped deformed laminate spacer article of the invention comprising upper substrate layer 440, lower substrate layer 442, through hole 451, vibration damping material layer 444, deformations 446 and 450 and protrusions 448 and 452 of the upper substrate layer 440, and deformation areas 454 and 456.

Figure 15:
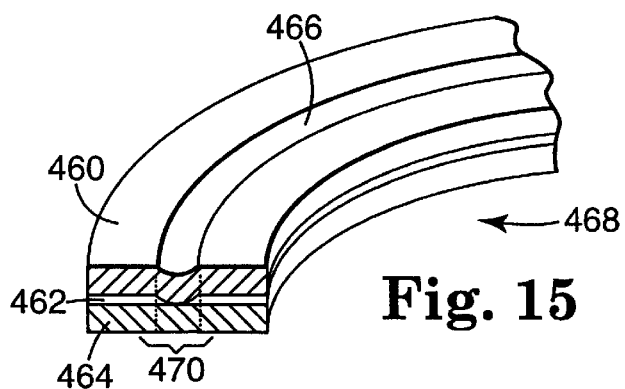

FIG. 15 is a partial cross-section of another embodiment of a ring-shaped deformed laminate spacer article of the invention comprising upper substrate layer 460, lower substrate layer 464, through hole 468, vibration damping material layer 462, deformation 466 of the upper substrate layer 460, and deformation area 470.

Figure 16:
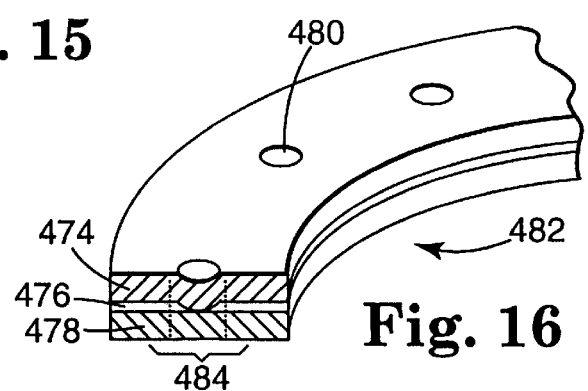

FIG. 16 is a partial cross-section of another embodiment of a ring-shaped deformed laminate spacer article of the invention comprising upper substrate layer 474, lower substrate layer 478, through hole 482, vibration damping material layer 476, circular deformation 480 of the upper substrate layer 474, and deformation area 484.

Figure 17:
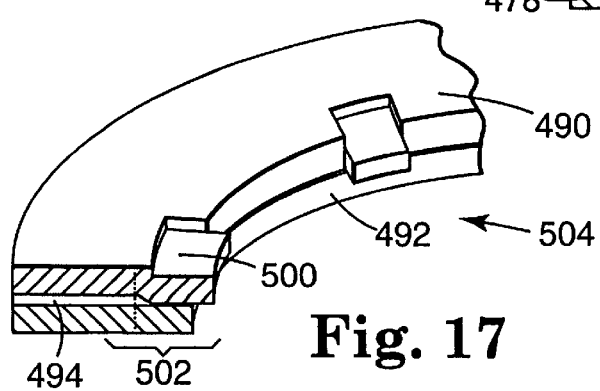

FIG. 17 is a partial cross-section of another embodiment of a ring-shaped deformed laminate spacer article of the invention comprising upper substrate layer 490, lower substrate layer 492, through hole 504, vibration damping material layer 494, deformations 500 of the upper substrate layer 490, and deformation area 502.

Figure 32:
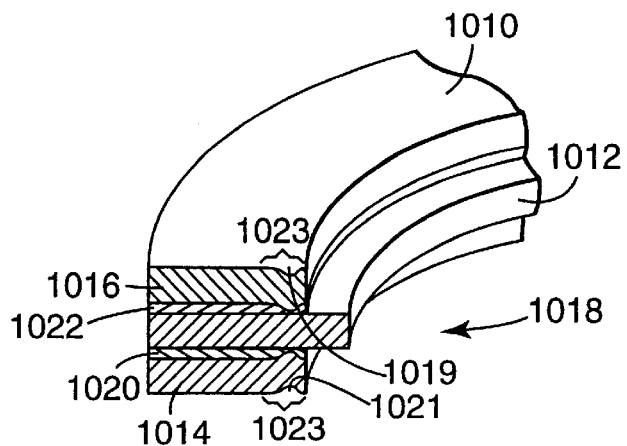

FIG. 32 is a partial cross-section of yet another embodiment of a ring-shaped deformed laminate spacer article of the invention comprising upper substrate layer 1010, lower substrate layer 1014, inner substrate layer 1012, through hole 1018, vibration damping material layers 1020 and 1022, deformations 1019 and 1021, and deformation area 1023.

Tooling and Method for the Deformed Spacer Article

The deformed damped laminate spacer article of the invention is typically made by a method wherein at least a portion of the vibration damping material is permanently displaced and the substrate layer(s) is plastically deformed in the intended force application area to provide improved force retention of the attachment device as compared to a similar laminate spacer article that does not have the damping material permanently displaced and the substrate layers plastically deformed (and does not use a fibrous, particulate or filler enhanced damping material to bridge the damping material) in the same area. Since most applications require more than one spacer, typically 1–8 spacers or more, the force loss is coupled between the spacers. Thus, a 1% improvement in force retention for a design may seem small, but in a given application the 1% force loss improvement coupled to 8 spacers is a force retention loss not experienced of many psi, thus enabling the force application system to retain sufficient force in an application. For example, force retention loss of a few percent in a disk drive assembly could allow a disk to shift due to a shock and cause data to be lost that was written onto the disk previously.

The damping material is typically permanently displaced and the substrate layers are typically plastically deformed in the intended force application area by means of applying pressure to at least one outer substrate layer surrounding the vibration damping material layer and forcing the vibration damping material away from the intended fastener area. The substrate layers take on a permanent set (plastic deformation) from the force or pressure used to displace the vibration damping material, thus, hindering the vibration damping material from recovering back into the area from which it was displaced.

If a substrate layer is not sufficiently plastically deformed, it can recover back to a portion of its pre-deformation position. This can create a spacing between substrate layers and a residual spring force. When the attachment device is attached in this area, this residual spring force can reduce the force retention of the attachment device as the initial force used to apply the attachment device is used to overcome the residual spring force in the substrate layers.

The punch tools useful according to the invention can be used to concentrate force(s) in a desired localized area to permanently displace at least a portion of vibration damping material in the intended force application area of the damped laminate article and to plastically deform at least one substrate layer in such a way as to eliminate or minimize the amount of elastic recovery of the vibration damping material and also to limit the residual spring force between substrate layers.

The through hole area (and/or another area of the laminate article such as a central portion and/or an outer edge) can be subjected to an applied force via a specifically designed punch tool that uses a specific punch design to concentrate the punch force and permanently displace at least a portion of the vibration damping material and plastically deform the substrate layer(s) in the intended deformation area. Typically, the location of the through hole is such that the through hole is surrounded by a deformation area. The through hole may also be partially surrounded by a deformation area. Typically the area of each deformation area surrounding or partially surrounding at least one through hole is about 0.001 to about 100 times the area of each through hole, preferably about 0.001 to about 1 times the area of each through hole.

At least one substrate in the deformed spacer article of the invention may have a variable thickness in a deformation area. The spacer article of the invention may have at least one protrusion and/or indentation (such as a ledge, raised design, valley, crevice, notch, crimp, bevel, coin, ridge, etc.) in the first and/or second substrate layer (and any optional substrate layer).

The punch tool will also impart a feature or deformation into the laminate spacer article by plastically deforming at least one substrate in addition to displacing at least a portion of the vibration damping material. The outer substrates of the laminate spacer article may contain protrusions and/or depressions such as ledges, notches, bevels, etc.

Instead of providing a laminate and then deforming the substrate layer(s), one may optionally initially provide substrate layer(s) wherein at least one layer has a deformation and provide a layer of vibration damping material therebetween.

Design considerations of the punch tool used to make the deformed spacer article include the tool's ability to limit the amount of slippage of the outer substrate layers (the upper and lower substrate layers) by applying frictional and/or gripping and/or holding forces to the substrate areas and to concentrate the deformation forces of the tool to permanently displace the damping material, deform the substrate layers to minimize substrate layer residual spring force and minimize the recovery of the damping material and feature the deformation area to minimize the surface area that will contact the attachment device and reduce dynamic friction.

Methods or materials to improve the tool's operation in displacing the vibration damping material and plastically deforming the substrate(s) during the stamping operation include, but are not limited to, the following:

a) Heating the damped laminate spacer article to lower the modulus of the vibration damping material for the deformation of the laminate spacer article. This added heat allows the vibration damping material to be more easily displaced (less force needed to displace) as its modulus is lower. Heat applied during stamping is much more desirable, simple and cost effective than using heat during the assembly of the deformed laminate spacer article of the invention and a rotatable storage article(s) with an attachment device on a disk drive. Heat can be applied to the laminate during or before the deformation process step. The heat can be applied using ultraviolet or infrared heat sources, steam, heated air, ovens, etc., such that the damping material's storage modulus is lowered. The damping material is usefully reduced in modulus if the storage modulus at the deformation step is reduced by at least 10%, preferably by 25% and most preferably by at least 50%;

b) Using vibration damping materials with little to no crosslinking to reduce the force needed to displace the vibration damping material during the deformation process;

c) Making and using a damped laminate spacer article wherein the vibration damping layer initially has less mass in the area(s) to be deformed to reduce the force needed to displace the damping material. This method, however, requires a more complex process to manufacture the laminate spacer article; and d) Using lubricants to reduce frictional losses in the tool as it deforms the substrate(s). Lubricants will also increase the tool's life.

The tool used to reduce and/or eliminate the vibration damping material will also deform the substrate layer(s). The deformation of these layer(s) can lead to a hole size reduction as the substrate layer can be plastically deformed to narrow the hole size. (Hole size could also be increased). The deformation process can also lead to slightly raised substrate surfaces or protruding edges caused by the particular tool used to displace the vibration damping material. Knowledge that this will occur is sufficient to design the completed damped laminate spacer article such that desired design criteria can be met, such as for a specific finished hole diameter. For example, the initial hole diameter can be selected to be larger than the desired final hole diameter such that when the deformation process occurs, the substrate layers are deformed such that the hole diameter will decrease due to the plastic deformation of the substrate layers to yield a final desired article having the desired hole diameter.

The method used according to the invention can be designed to minimize the displacement of the substrate layer(s) in areas that are not desired if the deformation of the substrate layer(s) is problematic. Options to accomplish this include, but are not limited to, the use of secondary tools after the deformation process that reform the substrate layers to a more desirable configuration while having a minimal effect on the force retention of the laminate. Secondary tools can enlarge the holes (reaming or drilling) if the initial hole size cannot be sufficiently enlarged to be at a final desired hole size following the deformation operation. The deformation area can also be flattened by other tools to lower or change the deformation area profile.

The deformed region of the substrate is typically surrounding the through hole area. The deforming can occur on one or both sides of the laminate and/or in an interior substrate layer(s), if present.

Punch tools have working surface(s). The working surface is that part of the punch tool that comes into contact with the laminate spacer article when using the punch tool.

FIGS. 8, 8*a*, 9, 10, 11, and 12 show cross-sections of various tools that can be used to achieve some degree of deformation in the substrate layer(s) and displacement of the vibration damping material. The punches are disclosed in WO 96/21560 and U.S. Pat. No. 5,691,037, both assigned to the assignee of the present invention. These tools are typically mounted in a stamping press that engages the tool to the laminate spacer article surface(s) and applies the force to deform the substrate layer(s) and displace the vibration damping material in the deformation area and to plastically deform the substrate(s) to achieve the improved fastening systems force retention.

Figure 8:
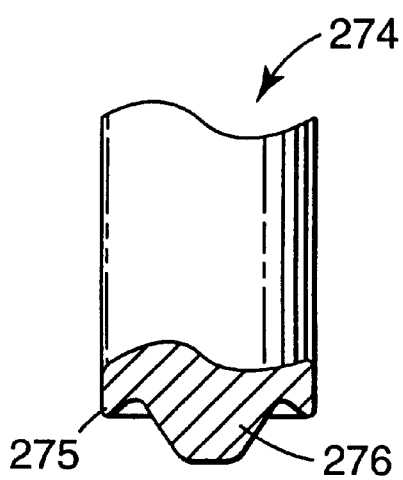
FIGS. 8, 8a, 9 and 10 are side views of different embodiments of prior art punches useful in making an embodiment of the spacer article of the present invention.

FIG. 8 is a side view of an angled gripping feature "V" prior art punch 274 with a blunt nose "V" protrusion 276 and angled gripping feature 275 that can be used to make the deformed spacer article of the invention.

Figure 8A:
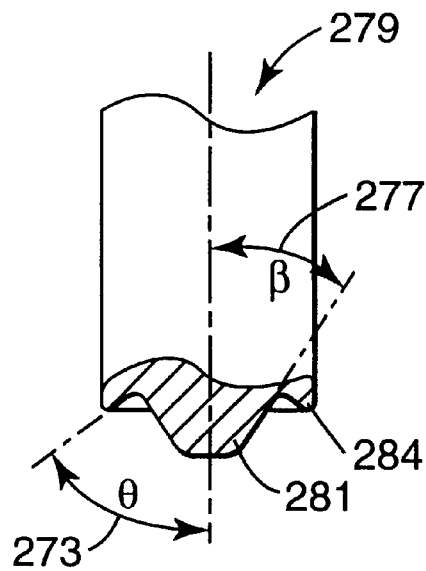

FIG. 8A is a side view of an angled gripping feature "V" prior art punch 279 with a symmetrical blunt nose "V" protrusion 281 and angled gripping feature 284 that can be used to make the deformed spacer article of the invention. Also shown is angle ($\theta$) 273 that is defined by the intersection of a first line tangent to a gripping feature surface and a second line passing through the center of symmetry of the protrusion but intersecting the first line at a point inside the protrusion and inside the punch tool, on a side of the punch tool having the end. Also shown is angle ($\beta$) 277 that is defined by the intersection of a first line tangent to a protrusion surface and a second line passing through the center of symmetry of the protrusion, but intersecting the first line at a point outside the protrusion and outside the punch tool, on a side of the punch tool having the end.

Figure 9:
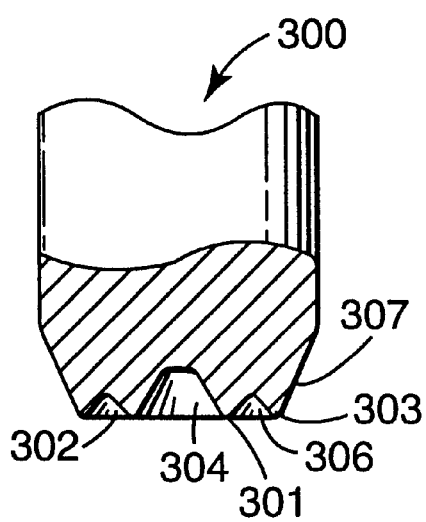

FIG. 9 is a side view of a strengthened angled gripping feature "V" prior art punch 300 with recessed frustoconical area 304 and recessed conical areas 302 and 306 and strengthened, tapered side 307, and gripping feature 303 that can be used to make the deformed spacer article of the invention.

Figure 10:
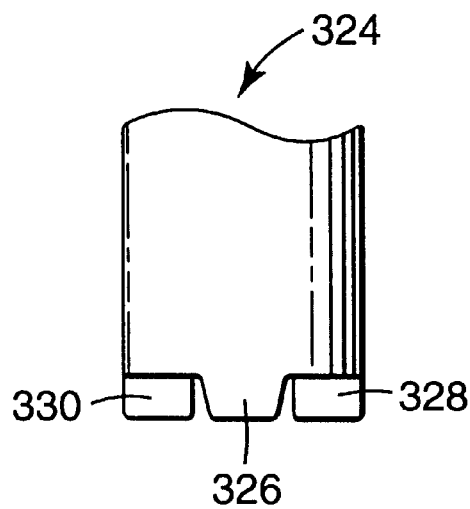

FIG. 10 is a side view of a prior art flat punch 324 with slots and protrusions 326, 328, and 330 that can be used to make the deformed spacer article of the invention.

Figure 11:
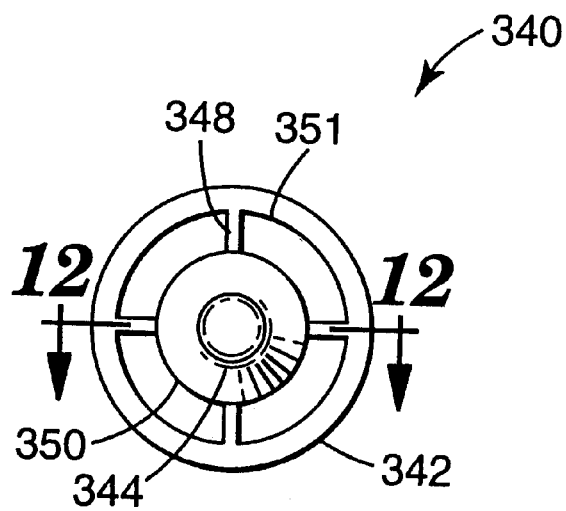
FIG. 11 is a bottom view of a prior art punch useful in making an embodiment of a spacer article of the present invention.
Figure 12:
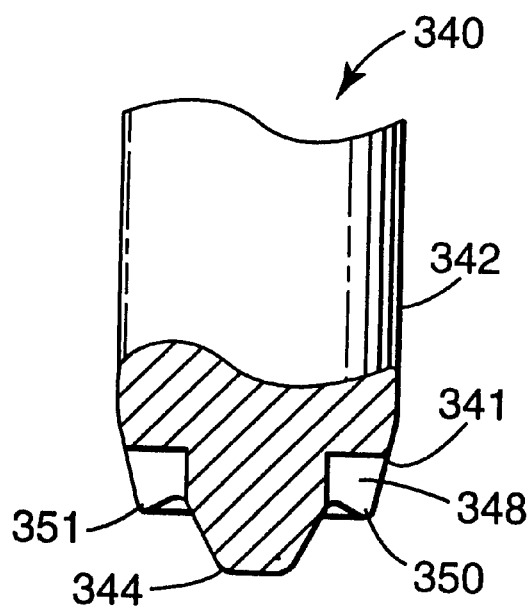
FIG. 12 is a partial cross-section of a prior art punch useful in making an embodiment of the spacer article of the present invention taken along line 12—12 of FIG. 11.

FIG. 12 is a side view of a strengthened, vented, angle-gripping feature "V" prior art punch 340, with vent 348, gripping feature recess 350, "V" protrusion 344, strengthened sides 341, outer diameter of punch 342, gripping feature peak 351 that can be used to make deformed spacer articles. FIG. 12 is the cross-section 12—12 of FIG. 11. FIG. 11 is the bottom view of the punch shown in FIG. 12.

Useful punches typically have an aspect of the tool that applies force in more than one direction to the laminate surface(s). For example, a first force may be applied by the tool at an angle to the laminate spacer article surface and preferably at an angle towards the through hole of the intended deformation area. The gripping feature of the punch tool provides this first force. The force serves to push material to the through hole (substrate and vibration damping material) and also can prevent the substrate layer from slipping away from the through hole.

A second force may be applied in the hole area and is at an angle designed to apply the most force in the downward direction and outward from the through hole. The protrusion of the punch tool provides this second force. These two forces working together will concentrate the tool force in a manner to displace the vibration damping material mass and deform the substrate(s).

The tool design is based on the substrate materials used, through hole size, thickness of the laminate, thickness of each layer in a laminate, vibration damping material used and layer types in the laminate. The punches used according to the invention may also have some unique requirements due to their design. For example, the punches may require "venting" or "slotting" to allow escape of fluids used in the stamping process that can be entrapped in cavities or pockets the punch may form between the punch end and the laminate during the tool's use. The entrapped fluid may not be highly compressible and can impede the punch deformation of the laminate if not allowed to escape when under pressure. In addition, the punches may require added strength designs to prevent the tool from cracking, flexing, or having premature wear during the stamping process. The added strength or support to the punch may be added by tapering the tool end to a wider shaft (tapering the shaft adjacent to the tool end). This will add strength to the gripping features near an edge of the tool. The punches may also require a higher grade or different grade of tool steel to enhance the tool life then may typically be used for other punch type processes on the laminate (for example, piercing, embossing or coining).

The text handbook of metal forming (McGraw-Hill, Inc. Lange, ISBN 0-07-036285-8) gives a good overview of stamping processes and equipment in general. Useful tool designs which accomplish the vibration damping material displacement and plastic deformation of the substrate layers include but are not limited to those tools that have flat, round, bullet (such as pointed conical, etc.), "V" (conical) or flat with a protrusion style punch design. These tool designs should be such that the majority of the force is applied in the direction normal or perpendicular to the laminate surface. This can require a flat, flat with a protrusion, a round or a bullet punch to have a large radius as compared to the through hole and a "V" style punch with small angles to the horizontal of the laminate. Useful round, bullet, or flat style punches are those which have a radius (or equivalent over sizing for non-round holes) at least about 1.01 times greater than the through hole diameter, preferably at least about 1.5 times greater, and most preferably at least about 2 times greater than the through hole diameter. The angle of the "V" style punch is typically from 1 degree to 89 degree as defined by the intersection of a first line tangent to the surface of the "V" protrusion and a second line parallel to a surface of the tool shaft and passing through the center of the "V" type protrusion preferably from 20–89 degrees, and most preferably from 30–89 degrees.

Preferred tools are those that include a gripping features and at least one protrusion. The preferred punch tool for preparing a deformed spacer article comprises a shaft having an end, wherein said end comprises (i) at least one protrusion; and (ii) at least one gripping feature. The gripping features are preferably selected from the group consisting of textured surfaces, continuous ridges, discontinuous ridges, continuous ridges having textured surfaces, and discontinuous ridges having textured surfaces.

The tools will deform the laminate in at least two main directions. The direction of at least two of the forces generated by the punch tools working surfaces are at angles to each other and the resultant forces or tool effect generates a displacement of the vibration damping material mass and plastic deformation of at least one substrate layer. The deformation of the substrate layer(s) also preferably limits the residual spring effect of the substrates, reduces vibration damping material recovery and reduces dynamic friction losses during use. This tool design should achieve at least about a 5% increase in attachment device force and/or torque and/or pressure and/or stress retention and may achieve greater than about a 35% improvement in retention as compared to a laminate spacer article with no displacement of the vibration damping material and plastic deformation of the substrate layers. The gripping feature(s) of the tool directs a portion of the laminate material in the area surrounding the hole in an angled (opposite the protrusion) direction. The resultant forces of this tool will concentrate the forces in a fashion to displace the vibration damping material, provide for substrate deformation to reduce vibration damping material recovery, reduce substrate spring effect and potentially reduce dynamic friction.

The punch tool's protrusions include but are not limited to those selected from the group consisting of frustoconical, elliptical, spherical, hemispherical, bullet-shaped, cylindrical, and conical protrusions and variations between these. The gripping features include but are not limited to those selected from the group consisting of a textured surface(s), continuous ridges, discontinuous ridges, continuous ridges having textured surfaces and discontinuous ridges having textured surfaces.

The tools used to displace the vibration damping material may also partially close or further open the hole during the deformation process. The hole diameter should be selected to take into account the tool design and the effect it has on the hole diameter so that the resultant spacer article has its intended dimensions.

The preferred tool design includes a symmetrical protrusion and gripping feature on the end of the tool. The protrusion has at least one angle as defined by the intersection of a first line tangent to a surface of the protrusion and a second line passing through the center of symmetry of the protrusion but intersecting the first line at a point outside the protrusion and outside the punch tool, on a side of the punch tool having the end. The angle is between 0.5–89 degrees, preferably is from 20–89 degrees and most preferably from 30–89 degrees.

The gripping feature has at least one angle as defined by the intersection of a first line tangent to a surface of the gripping feature and a second line passing through the center of symmetry of the protrusion but intersecting said first line at a point inside the protrusion and inside the punch tool, on a side of the punch tool having the end. The angle is between 0.5–89 degrees, preferably is from 20–89 degrees and most preferably from 30–89 degrees. FIG. 8A is a cross-section showing an example of the angles, for a punch tool 279 having angle β 277 of the protrusion 281 and angle θ 273 of the gripping feature 284.

Furthermore, the tool is usefully designed such that the deformation of the laminate as caused by the gripping feature of the tool occurs as the protrusion part of the tool is also deforming the laminate. The tool should be designed to concentrate and build the mechanical forces on the damping material to cause the damping materials displacement and plastic deformation of the substrate.

SPACER ARTICLE FORCE RETENTION

The damped spacer article is preferably designed to have an initial force retention value such that a later additional force application step is not required. A spacer article without a force retention of at least about 92% (as measured as described below) may have too great a loss of force retention after the initial force application thus requiring additional force application to prevent rotatable storage article slippage and/or movement during the drive operation or shock event which could cause rotatable storage article damage and/or loss of data. The force (pressure/torque/stress)retention of the spacer article of the invention is preferably at least about 95%, more preferably at least about 97%, and most preferably at least about 98.5%, as measured according to the test described later herein.

The spacer articles of the invention may optionally further comprise additional substrate layer(s), component(s), section(s), etc., besides the substrate layers, substrate components, substrate sections, etc. In addition, the spacer article may also further comprise additional vibration damping material layers, components, etc. The article may optionally further comprise a bonding material layer(s) or ring(s), for example. The bonding material may be bonded between the substrate and the vibration damping material, for example, or between multiple substrates or between multiple vibration damping material layers or components, for example, wherein the storage modulus of the bonding material, is optionally higher than that of the vibration damping material to which it is bonded. Examples of useful bonding materials include but are not limited to those selected from the group consisting of epoxy resins and cyanoacrylates. Preferably, the storage modulus of the bonding material layer or ring is less than that of a substrate to which it is bonded.

DISK DRIVE ASSEMBLY

The present invention also provides a disk drive assembly having at least one spacer article disclosed herein and at least one rotatable storage article positioned on a spindle. A disk drive assembly can be provided by first providing a disk drive, the disk drive having a spindle. A rotatable storage article may be positioned on the spindle such that the spindle extends through a through hole in the rotatable storage article. A damped spacer article(s) of the invention may be positioned on the spindle such that the spindle extends through a through hole in the spacer article, wherein at least one spacer article is positioned adjacent to and in contact with a rotatable storage article. Spacer articles may be positioned above and/or below rotatable storage articles. Thus, the disk drive would have at least one rotatable storage article and at least one spacer article positioned on the disk drive spindle. Frequently the rotatable storage articles would alternate with spacer articles on the spindle. Frequently an attachment device such as a clamp would be used to hold the rotatable storage article(s) and spacer article(s) onto the spindle and under a holding force.

The holding force typically is in the range of at least about 340,000 Pascals more typically about 340,000 to about 7,000,000. Pascals and most typically about 1,000,000 Pascals to about 3,500,000 Pascals. Depending on the order in which they are placed on a spindle, a rotatable storage article or spacer article may be directly under the attachment device. It is preferred that a rotatable storage article be positioned so as to have a damped spacer article in contact with each of its sides.

Figure 5:
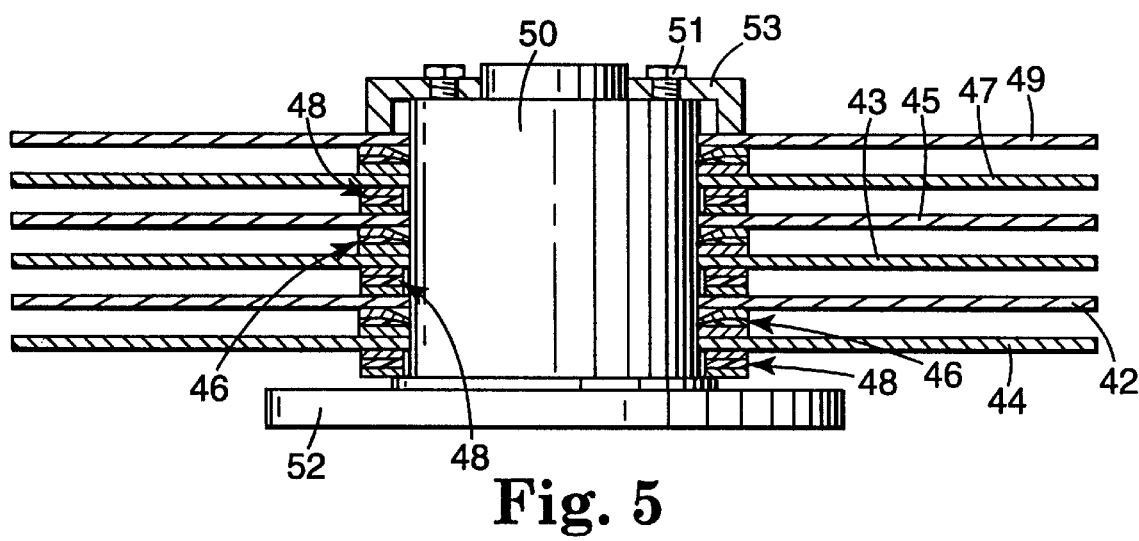
FIG. 5 illustrates a cross-sectional view of a disk drive assembly of the invention.

FIG. 5 illustrates a disk drive assembly of the invention comprising spindle base 52 and spindle 50 attached thereto. Rotatable storage articles 42, 44, 43, 45, 47 and 49 are positioned on the spindle 50. Damped spacer articles 46 and 48 are positioned therebetween. Spacer article 46 is similar to that of FIG. 4. Spacer article 48 is similar to that of FIG. 6. Clamp 53, along with screws 51, holds the rotatable storage articles 42, 44, 43, 45, 47, and 49 and spacer articles 46 and 48 in place.

Figure 7:
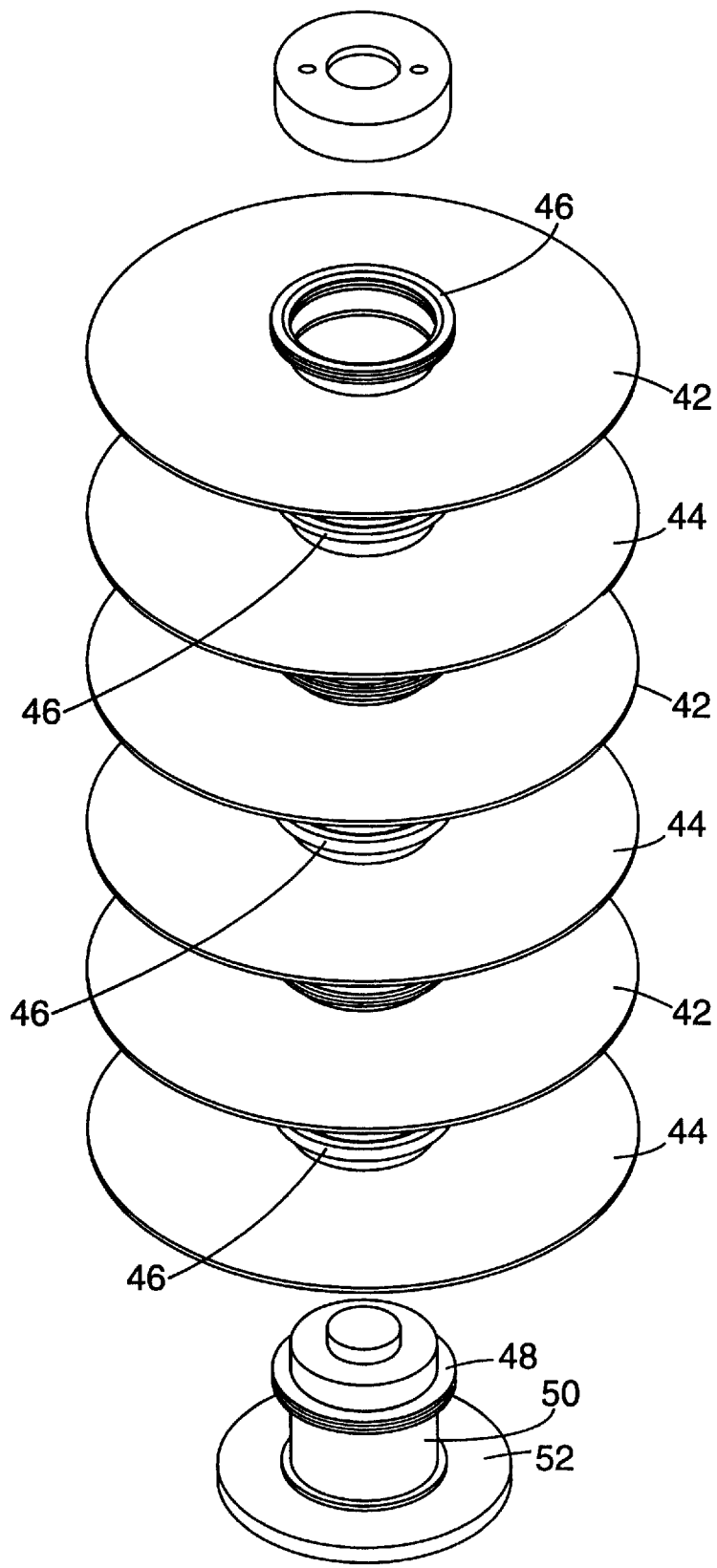
FIG. 7 illustrates an exploded view of the disk drive assembly of FIG. 5.

FIG. 7 illustrates an exploded view of the disk drive assembly of FIG. 5.

A damped spacer article that has been cleaned and prepared for assembly into a drive preferably has an outgassing level of organic, organo-metallic, and metallic components that is preferably less than about 20 $\mu g/cm^2$, more preferably less than about 0.5 $\mu g/cm^2$ and most preferably less than 0.05 $\mu g/cm^2$ when exposed to a temperature of 85° C. for 4 hours. Specific materials that are capable of outgassing include, but are not limited to: siloxanes, hydrocarbons, esters, organic acids, alcohols, amines, organo tins, amides, catalysts, and the like. It is also preferable that any one category of components is less than 50 weight % of the total and more preferably less than 10 weight % of the total outgassing level by weight. For example, it is preferable that the total amount of outgassed components would not include 50 weight percent or more of siloxanes.

The anion/ionic levels of the damped spacer article are preferably below about 0.05 $\mu g/cm^2$, more preferably less than about 0.02 $\mu g/cm^2$ and most preferably less than about 0.005 $\mu g/cm^2$. Specific components that contribute to anion/ionic levels include: chloride, nitrate, nitrite, sulfate, fluoride, bromide, phosphate and the like. It is also preferable than individual components are less than 50 weight % of the total, more preferably less than 10 weight % of the total outgassing level by weight.

TEST METHODS

The following test methods were used herein. A Laser Vibrometer was configured to test the vibration levels of the storage disk mounted on a spindle. The spindle was attached to a vibrating shaker to excite the resonances of the disks. The benefits of the damped spacers was determined by reduction in vibration by measuring the RMS displacement of the disk over frequencies ranging from 200 Hz to 1,000 Hz when excited by the shaker and having damped spacer article or non-damped spacer article in contact with the disk.

Determination of Vibration Acceleration and Disk Displacement

A laser vibrometer, Polytec Model PSV-200 scanning laser vibrometer, was configured to test the vibration levels of a storage disk mounted on a spindle. The spindle was attached to a vibrating shaker to excite the resonances of the mounted disk. The vibration acceleration and displacement of an excited disk having a damped spacer article or a non-damped spacer article in contact with the disk were determined. The data was converted to the root mean square (RMS, i.e., the square root of the arithmetic mean of the squares of a set of numbers). Optionally, amplitudes of various resonant peaks were compared.

Equipment Setup

Figure 36:
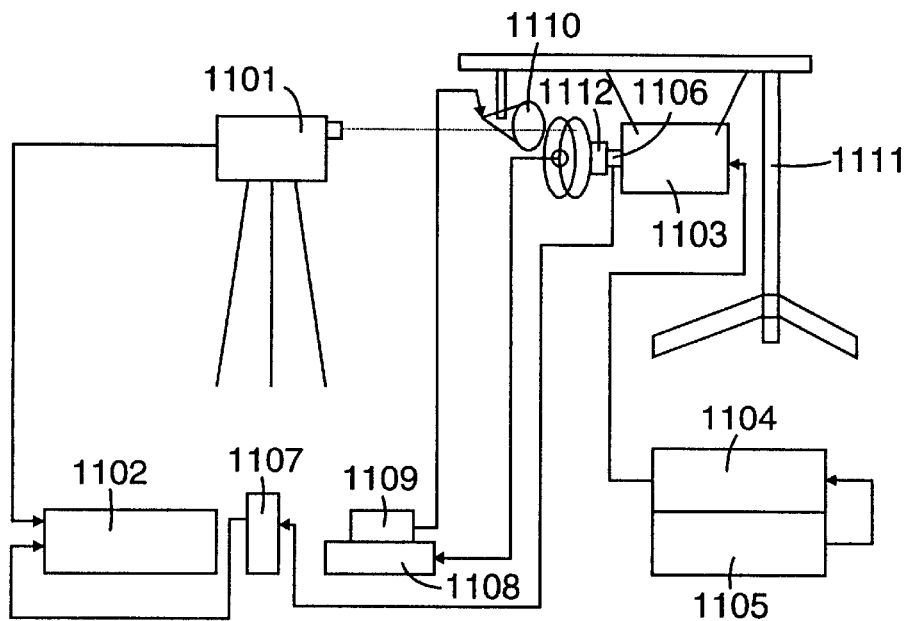
FIG. 36 illustrates a schematic of the testing set-up for measuring vibration damping performance of the spacer articles in a disk drive assembly.

FIG. 36 illustrates the test equipment setup with the components numbered as identified in the following section.

Laser Vibrometer Test Equipment

Figure 37:
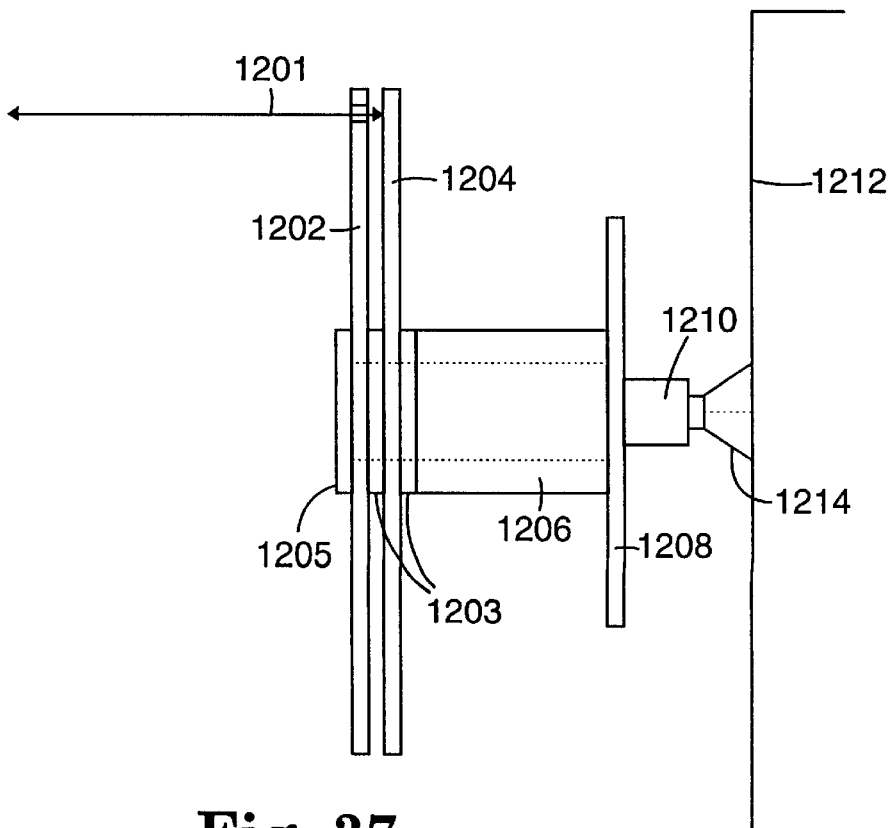
FIG. 37 illustrates an expanded view of a portion of the schematic of the testing set-up of FIG. 36, which shows primarily the spindle assembly from a disk drive.

1101-Polytec Model PSV-200 scanning laser vibrometer
    1102-Polytec Model OFV 3001 S vibrometer controller with 133 MHz Pentium™ computer containing Polytec Version 5.2 controlling software
    1103-MB Dynamics Model Modal 50 shaker
    1104-MB Dynamics Model SS250VCF power amplifier
    1105-Tektronix Model 2630 Personal Fourier Analyzer controlled with a Toshiba Model T2200SX notebook computer
    1106-PCB Model 208A05 force transducer
    1107-PCB Model 482A16 signal conditioner
    1108-Fluke Model 2100A digital thermometer with thermocouple
    1109-Staco Model 3PN1010 variable transformer
    1110-Sylvania Model 250R40/1 infrared heat lamp
    1111-The Modal Shop Model 2050A lateral excitation stand
    1112-spindle assembly Double Spacer Test Fixture An assembly of two spacer articles to be tested and two 0.81 mm (32 mils) thick aluminum rotatable storage articles was set on the spindle of a disk drive. The aluminum rotatable storage articles used had inner diameters (ID) of about 25 mm and outer diameters (OD) of about 95 mm. A 6.35 mm (0.25 inch) diameter hole was drilled in the top disk to provide a line of sight for the laser beam to the second disk on which velocity measurements were made. The second rotatable storage article had a test spacer article on each side of it. The remaining space on the spindle assembly was taken up by a cylindrical take-up spacer. The entire assembly was fixed to the spindle using a three-screwed spindle clamp. The spindle clamp was torqued to 1.5 inch/ounces (0.01 Newtons.meter) using a torque wrench. This set-up is illustrated in FIG. 37 as follows:

1201-laser beam
    1202-aluminum rotatable storage article
    1203-test spacers
    1204-aluminum rotatable storage article measured
    1205-spindle clamp
    1206-cylindrical take-up spacer
    1208-spindle flange
    1210-force transducer
    1212-shaker Test Conditions Input Force A 2 volt chirp signal ranging from 100 Hz to 1,100 Hz with 8192 time domain lines of resolution (4096 frequency domain lines) was generated by the Tektronix Analyzer for input to the MB Dynamics power amplifier. The level control setting for the power amplifier was X2 and was set at constant voltage, thus, imparting a RMS dynamic force of 8 Newtons by the MB Dynamics shaker into the hub area of the spindle as measured by the PCB force transducer. The PCB signal conditioner was set to a gain of X100.

Vibrometer Settings

Both the reference and vibrometer (A&B) channels were used to measure the input force and the velocity response. Magnitude averaging was used with an average of three measurements used to determine the frequency response function. The range setting for the vibrometer was 125 mm/s/volt. No tracking filter was selected.

Frequency

A 1 kHz bandwidth was specified that resulted in a 2.56 kHz sample frequency in the time domain. Only data between 0.2 and 1 kHz was used in the analysis. The antialias filter was used to minimize aliasing when the data was transformed from the time domain to the frequency domain.

FFT or Time

The vibrometer was set at 3,200 lines of spectral resolution, of which 2,561 lines were used to minimize leakage during the transformation of the data from the time domain to frequency domain. No windowing was used on either the input or response channels of the vibrometer.

Trigger

The test was triggered off of the reference with the trigger set to a rising level of 5% of full scale and a pretrigger of 10% of the sample length.

Range

The range setting for the input (Channel A) was set at 5 volts with a signal type setting of Force and a calibration of 44.56 Newtons per volt. The range setting for the response (Channel B) was 10 Volts.

Measurement

A single frequency response function was determined from the average of three measurements taken near the outer edge of the second disk in the double disk assembly previously described. A small piece (0.5 sq. cm.) of 3M Type 7610 retro-reflective tape was placed on the disk surface at the test point.

The frequency response function was then imported into a spreadsheet and integrated to convert from velocity to displacement. The displacement was subjected to RMS analysis and reported in microns/Newton as a function of temperature in Table I (FIG. 40) and graphically in FIG. 39.

Figure 38:
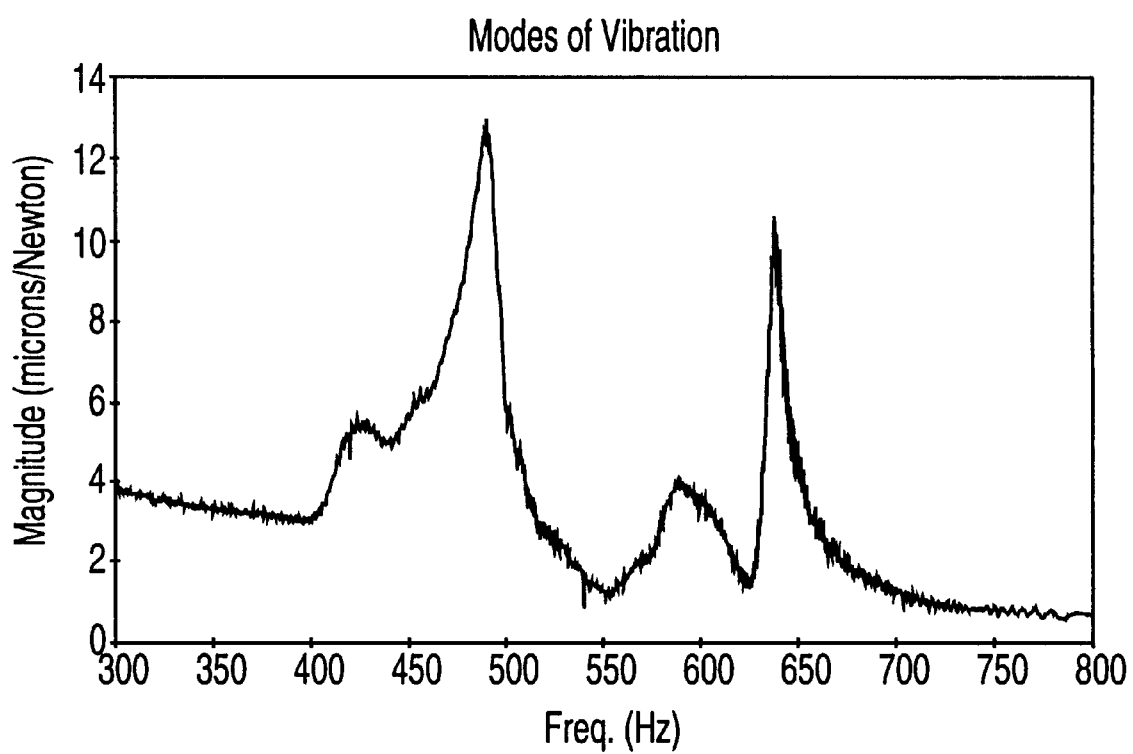
FIG. 38 illustrates a graph showing the modes of vibration (frequency versus magnitude) for various rotatable storage articles described in the Examples.

A sample of the typical resonant peaks that the RMS analysis is used on is shown in FIG. 38.

Temperature Control

The temperature of the assembly was controlled with radiant heat from an infrared lamp controlled by a variable transformer. The lamp was placed at a 45 degree angle to the plane of the disk over the right half of center at a distance of 5 cm from the surface of the disk.

Increments of 0 (transformer off), 40, 50, 60, 70 were used on the transformer that produced temperatures of room temperature (setting of 0) and approximately 10–15 degrees C increments respectively, beginning at 45 degrees C, as measured in the hub area of the disk assembly.

Force Retention Test Method

To test the damped spacer article for force retention performance, a damped spacer article was set between two metal surfaces of an INSTRON force application and measurement system. An initial force ($F_I$) of between 1.24 MPa and 1.52 MPa (180 and 220 psi) was quickly applied (within about 0.2 to about 2 seconds) by lowering a mechanical arm onto the spacer article being tested. A force gauge in the arm was used to measure the force ($F_F$) periodically over 15 minutes. The percent of force retained ($F_R$) at 25° C. was determined as $F_R=[(F_I-F_F)/F_I]\times 100$.

EXAMPLES

The invention has been described with reference to various specific and preferred embodiments and will be further described by reference to the following detailed examples. It is understood, however, that there are many extensions, variations, and modifications on the basic theme of the present invention, beyond that shown in the examples and detailed description, which are within the spirit and scope of the present invention.

Examples 1–9 and Comparative Examples 1–3

In order to evaluate the performance of various damped spacer articles with good fastener force retention, various samples were prepared.

Description of Sample

For the purpose of demonstrating the invention, three viscoelastic damping materials were used in various spacer designs.

One damping material was an acrylic damping material (3M ISD-142, available from Minnesota Mining and Manufacturing Company, St. Paul, Minn.) that had a loss factor of greater than 0.2, a loss modulus greater than 80,000 Pascals and a storage modulus of greater than 50,000 Pascals at 1 Hz and 25–80°. It was used as an inner layer of a laminate spacer article (i.e., between two aluminum substrate layers) or as an exterior layer of the damped spacer article (i.e., attached to the outside of an aluminum substrate layer).

A second damping material was a fluoroelastomer (FLUOREL FT-2481, available from Dyneon LLC Corp, Oakdale, Minn.) that had a loss modulus (G") of less than 400,000, a storage modulus (G') greater than 300,000 Pascals, and a loss factor (tan delta) of less than 0.5 at 1 Hz and 25–80° C.

A third damping material used was a nitrile viscoelastic polymer with a Shore A hardness between 65–75 (available from C&C Packing, Inc.; White Bear Lake, Minn. under the tradename, AS-022 Buna N70).

Example 1 (Deformed Spacer Article)

A 0.051 mm thick layer of 3M ISD-142 was placed between two substrate layers of 1.1 mm thick aluminum. The damping material was laminated onto one substrate layer and the second substrate layer was placed onto the damping material layer to create a laminate material. Modest pressure with a rubber roller was used to make the laminate material which was then processed through several stamping and grinding operations as described below to form the internally damped spacer article of FIG. 13.

The laminate material was initially put into a mechanical press that applied significant pressure to the laminate material as it was positioned between a die and punch. Press tonnage was between 2.27–4.54×10$^4$ kg (25–50 tons). The die/punch set-up was designed as to impart a torque retention feature into the laminate material. After the punch process, the laminate material was pierced to add the center through hole, coined to impart a torque retention feature, blanked, and ground to a final thickness of 2.2 mm to provide an internally damped spacer article.

The damped spacer article was tested for damping performance according to the test method "Determination of Vibration Acceleration and Disk Displacement" above. Results are given in FIG. 40/Table I and represented graphically in FIG. 39.

The damped spacer article was also tested for force retention according to the test method "Force Retention Test Method" above. The data is in FIG. 42/Table II and graphically in FIG. 41.

Example 2 (High Modulus Vibration Damping Material Spacer)

A 0.051 mm thick layer of FLUOREL FT-2481 was placed between two pre-machined rings (25 mm inner diameter (ID), 31 mm outer diameter (OD)), that were each 1.1 mm thick aluminum. The damping material was laminated onto one substrate ring layer and the second substrate layer was placed onto the damping material layer to create an internally damped spacer article of FIG. 35. Modest pressure and heat was applied with a vacuum pad applicator (107° C. (225° F.) for 30 minutes) to produce a good bond between the aluminum rings and the FLUOREL FT-2481.

The damped spacer article was tested for damping performance according to the test method "Determination of Vibration Acceleration and Disk Displacement" above. Results are given in Table I and represented graphically in FIG. 39.

Example 3 (Back-to-back Spacer Article)

A spacer article similar to FIG. 24 comprising two channel containing damped spacer sections placed back-to-back was prepared as follows:

An aluminum ring having an ID of 25 mm, an OD of 31 mm, and a thickness of 1.1 mm was prepared by machining. Then, a continuous channel was machined around the mid-circumference of the ring. The channel had an ID of 25.5 mm, an OD of 30.5 mm, and a depth of 0.10 mm and was centered in the ring.

A die-cut ring of 3M ISD-142 having an ID of 26.2 mm, an OD of 29.6 mm, and a thickness of 0.127 mm was inserted into the channel in the aluminum ring with hand pressure. The damping material layer extended beyond the plane of the top of the channel, so that contact could be made with a disk when the spacer was placed against the disk on a spindle.

For this example, two spacer sections prepared above were placed back-to-back, thereby forming a spacer article of thickness 2.2 mm. The spacer article was tested as in Example 2. Test results are given in Table I and represented graphically in FIG. 39.

The force retention of this spacer article was good, as it had a direct mechanical path for the force to be passed along through the clamp to the spacer article and to the disk and spindle base. This spacer article allowed the disk assembly to be easily disassembled, especially when the spacer articles may have adhered to the disk they contacted due to the adhesive nature of the damping material layer.

Example 4 (Constrained Layer Damper Spacer Article)

The spacer article similar to FIG. 28 was prepared as Example 4.

An aluminum ring having an ID of 25 mm, an OD of 31.0 mm, and a thickness of 2.2 mm was prepared by machining. Then, a continuous ledge was machined around the circumference of the ring by cutting to a depth of 0.20 mm on both sides of the ring, from an ID on the ring of 28.0 mm to an OD of 31 mm. This created a torque retention feature of a protrusion on the ID, on both sides of the ring.

Next, 0.127 mm thick 3M ISD-142 was laminated to 0.117 mm thick polyester film (commercially available from 3M Company, St. Paul Minn., as 3M SCOTCHPAK™ polyester film.) to provide a damping material laminate. The damping material laminate was then die-cut in a ring having an OD of 30.5 mm and an ID of 28.65 mm. This damping material laminate ring was placed on each side of the continuous ledge of the aluminum ring. The thickness of the damping material laminate ring was greater than the depth of the ledge so that the laminate ring extended beyond the plane of the top of the protrusion. This allowed for contact with that portion of a disk it is placed against when used in a disk drive assembly and under slight compression.

The spacer article was tested as in Example 1. Test results are given in Tables I and II and represented graphically in FIGS. 39 and 41.

Example 5 (Segmented Constrained Layer Damped Spacer Article)

A spacer article somewhat similar to that of FIG. 27 was prepared as Example 4, except for the following differences:

The damped spacer article was made in the same manner as Example 4, except that the damping material laminate used was cut into four near equal size sections, each approximately 0.90 to 0.95 times the size of one quarter of the ring. Four sections were placed on each side of the continuous ledge of the aluminum ring approximately equally spaced apart from each other.

The spacer article was tested as in Example 2. Test results are given in Table I and represented graphically in FIG. 39.

Example 6 (Sideways U-Shaped Spacer Article)

A spacer article similar to that of FIG. 29 was prepared as follows:

An aluminum spacer that was 2.2 mm thick, 25 mm ID and 31 mm OD was machined to remove the internal aluminum portion from the OD into the ID until the desired notching or cut-out was complete. On a lathe, the aluminum was removed from the OD beginning at a depth from each side of the ring of 0.254 mm. The cut into the spacer extended from the OD of 31.0 mm to an ID of 26.6 mm.

An "O" ring-shaped vibration damping material component was then molded to provide a part that had the dimensions of approximately 1.7 mm diameter and an ID of 25.5 mm and OD of 29.0 mm. The vibration damping material component was molded from AS-022 Buna N70.

The vibration damping material component was placed into the inset cut-out of the aluminum ring. The spacer article was tested as in Example 1. Test results are given in Tables I and II and FIGS. 38 and 41.

Example 7 (Constrained Layer Damper Spacer Article)

A spacer article similar to that of FIG. 28 was prepared as in Example 4 except for the following differences:

An aluminum ring having an ID of 25 mm, an OD of 31.0 mm, and a thickness of 2.2 mm was prepared by machining. Then, a continuous ledge was machined around the circumference of the ring by cutting to a depth of 0.20 mm on both sides of the ring, from an ID on the ring of 27.5 mm to an OD of 31 mm. This created a torque retention feature of a protrusion on the ID, on both sides of the ring.

A 0.127 mm thick 3M ISD-142 was laminated to 0.117 mm thick SCOTCHPAK™ polyester film to provide a constrained damping material laminate. The damping material laminate was then die-cut in a ring having an OD of 30.5 mm and an ID of 28.65 mm. This damping material laminate ring was placed on each side of the continuous ledge of the aluminum ring. The thickness of the damping material laminate ring was greater than the depth of the ledge so that the laminate ring extended beyond the plane of the top of the protrusion. This allowed for contact with that portion of a disk it was placed against when used in a disk drive assembly and slight compression.

The spacer article was tested as in Example 2. Test results are given in Table I and represented graphically in FIG. 39.

Example 8 (Deformed Spacer Article)

A 0.051 mm thick layer of 3M ISD-142 was placed between two substrate layers of 1.1 mm thick aluminum. The damping material was laminated onto one substrate layer and the second substrate layer was placed onto the damping material layer to create a laminate material. Modest pressure with a rubber roller was used to make the laminate material that was then processed through several stamping and grinding operations as described below to form the internally damped spacer article similar to that of FIG. 17.

The laminate material was initially put into a mechanical press that applied significant pressure to the laminate material as it was positioned between a die and punch. Press tonnage was between $2.27–4.54\times10^4$ kg (25–50 tons). The die/punch set-up was designed as to impart a torque retention feature into the laminate material. After the punch process, the laminate material was pierced to add the center through hole, coined to impart a torque retention feature, and ground to a final thickness of 2.2 mm to provide an internally damped spacer article.

The spacer article was tested for force retention according to the test method hereinabove. Results are given in Table II and represented graphically in FIG. 41.

Example 9 (Constrained Layer Damper Spacer Article)

The spacer article of FIG. 28 was prepared similar to Example 4, except for the following differences:

An aluminum ring having an ID of 25 mm, an OD of 31.0 mm, and a thickness of 2.2 mm was prepared by machining. Then, a continuous ledge was machined around the circumference of the ring by cutting to a depth of 0.20 mm on both sides of the ring, from an ID on the ring of 28.0 mm to an OD of 31 mm. This created a torque retention feature of a protrusion on the ID, on both sides of the ring.

Next, 0.127 mm thick 3M ISD-142 was laminated to 0.117 mm thick 3M SCOTCHPAK™ polyester film to provide a damping material laminate. The damping material laminate was then die-cut in a ring having an OD of 30.5 mm and an ID of 29.28 mm. This damping material laminate ring was placed on each side of the continuous ledge of the aluminum ring. The thickness of the damping material laminate ring was greater than the depth of the ledge so that the laminate ring extended beyond the plane of the top of the protrusion. This allowed for contact with that portion of a disk it is placed against when used in a disk drive assembly under slight compression.

The spacer article was tested as in Example 8. Test results are given in Table II and represented graphically in FIG. 41.

Comparative Example 1 (Standard Aluminum Spacer Article)

Comparative Example 1 was a standard machined aluminum spacer article from a commercial disk drive assembly, which had a thickness of 2.2 mm, an ID of 25 mm, and an OD of 31 mm.

Comparative Example 2 (Internally Damped Spacer Article)

A 0.025 mm thick layer of 3M ISD-142 was placed between two pre-machined rings (25 mm ID, 31 mm OD) that were each 2.7 mm thick aluminum. The damping material was laminated onto one substrate ring layer and the second substrate layer was placed onto the damping material layer to create an internally damped laminate material. Modest pressure was applied to produce a good bond between the aluminum rings and 3M ISD-142 to form the spacer article similar to FIG. 2, but with no force retention fibers or particulate. No means for force retention was used. The spacer article was tested as in Example 8. Test results are given in Table II and represented graphically in FIG. 41.

Comparative Example 3 (Internally Damped Spacer Article)

A 0.051 mm thick layer of 3M ISD-142 was placed between two pre-machined rings (25 mm ID, 31 mm OD) that were each 2.7 mm thick aluminum. The damping material was laminated onto one substrate ring layer and the second substrate ring layer was placed onto the damping material layer to create an internally damped laminate material. Modest pressure was applied to produce a good bond between the aluminum rings and 3M ISD-142 to form the spacer article but without high modulus vibration damping material. No means for force retention was used. The spacer article was tested as in Example 8. Test results are given in Table II and represented graphically in FIG. 41.

The data in FIG. 39 is graphically represented in Table I of FIG. 40. Table I clearly shows the reduction in displacement of a disk when a damped spacer article of the invention was used as opposed to the standard aluminum spacer article (Comparative Ex. 1).

Figures 41, 42:
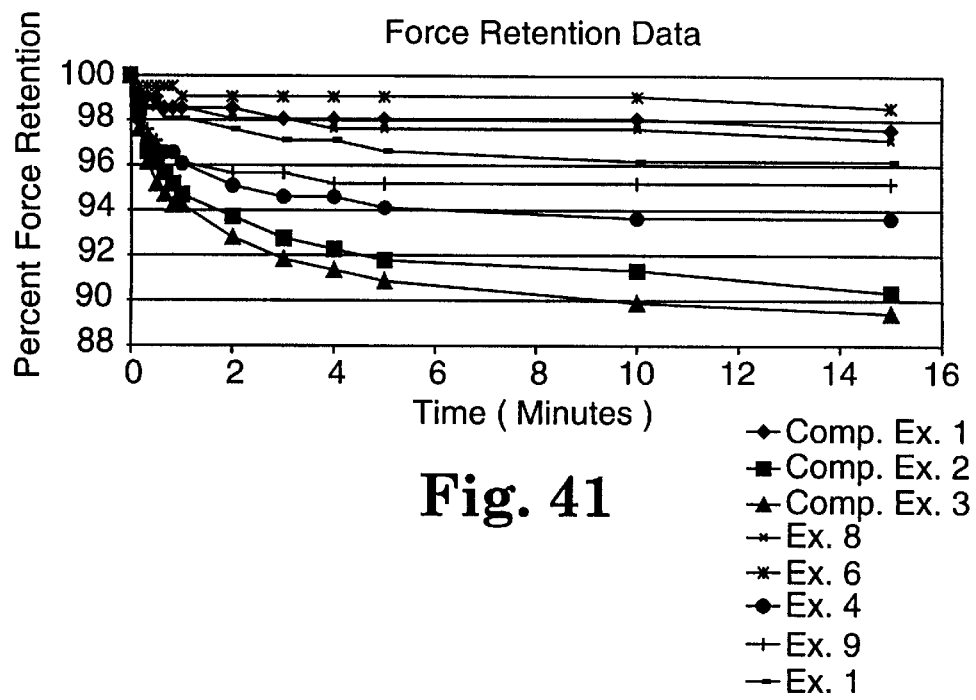
FIG. 41 illustrates a graph showing the spacer article performance comparison of force retention versus time for various damped spacer articles in the Examples.
FIG. 42 contains data for the graph in FIG. 41.

The data clearly shows that for a damped spacer article without a force retention means (either mechanical design or polymer design), significant force loss occurs as is shown in FIG. 41 and Table II of FIG. 42.

The damped spacer article of the invention can offer the potential to reduce the RMS (200–1000 Hz) from a few percent to 40 percent or more, depending on the reduction in RMS needed to improve the drive's reading and writing performance at the drive operating temperature. The RMS analysis could also be expanded beyond 200–1000 Hz, depending on the disk type tested with the damped spacer article designs. Disks that have lower or higher natural frequencies due to their design would potentially cause the RMS range to be shifted so that the dominate resonant vibration peaks are included in the analysis. These mode shapes include the 1,0 and 0,1 vibration modes and also include modes such as the 1,1; 2,2; 1,2, etc. Modes of most importance tend to be below the 5,5 mode vibration shape. When disks of different modulus and dimensions are used, the vibration mode frequencies can shift, changing the range of RMS selection to include the dominate vibration modes that effect the drives reading and writing performance.

The spacer designs also provide a design that offers high force retention of the means for securing the rotatable storage article and spacer article onto the spindle that is applying force to hold the disks and spacers on the spindle from slipping during operation and or high shock or vibration conditions that the drive may encounter during operation or shipping and handling or non-operating shock. The spacers are designed to provide at least 93% of the force retention of the standard aluminum spacer, preferably greater than 95%, more preferably greater than 97% and most preferably greater than 98.5%. Designs that fail to have a force retention means at the desired force retention level will allow a drive to fail.

A spacer article of the invention preferably is designed and positioned adjacent to a rotatable storage article such that is that does not cause any warpage, kinking, high spots, crimps, dents, bends or deflections of the rotatable storage articles as measured by a laser/optical device that tests for flatness (peak to valley, RMS, etc.). The peak to valley measurement of a rotatable storage article with the damped spacer secured to it is useful for drive read and writing use (plus reliability, etc.) if the peak to valley measurement across the disk read and writing surface area is less than 20 microns, preferably less than 10 microns, more preferably less than 7 microns, and most preferably less than 5 microns. The disk drive assembly can be tested in various optical flatness metrology test systems, such as a ZYGO MESA Flatness measuring tool, available from ZYGO Corporation; Middlefield, Conn.

Preferably the components of the disk drive assembly are selected and assembled such that the rotatable storage article has a flatness of preferably less than about 20 microns, more preferably less than about 10 microns, most preferably less than about 5 microns and an improvement of disk vibration RMS by at least about a 10%, preferably at least about 20%, most preferably by at least about 30 percent reduction and a force retention of at least about 93% as compared to a standard spacer in the same spindle and clamping means, and more preferably at least about 97%.

The foregoing detailed description and example have been given for clarity of understanding only. No unnecessary limitations are to be understood therefrom. The invention is not limited to the exact details shown and described, for variations obvious to one skilled in the art will be included within the invention defined by the claims.

What is claimed is:

1. A spacer article comprising
   (a) a substrate, the substrate comprising
      (i) a base having two major opposing surfaces, an upper surface and a lower surface, and
      (ii) at least one first protrusion joined to the upper surface of the base, each first protrusion having a height; and
   (b) a first constrained layer damper attached to the upper surface of the base,
      wherein the first constrained layer damper has a height such that it ranges from about 90 to about 300 percent of the height of the first protrusion having a greatest height on the upper surface of the base;
      wherein the first constrained layer damper independently comprises:
         (i) a constraining layer;
         (ii) a layer of vibration damping material bonded to the constraining layer, wherein the vibration damping material comprises viscoelastic material;
      wherein the storage modulus of the constraining layer is greater than that of the viscoelastic material in the vibration damping material;
      wherein the first constrained layer damper is attached to the base via its vibration damping material layer; and
   wherein the spacer article has a through hole therein.

2. The spacer article of claim 1, wherein said substrate further comprises
   (iii) at least one second protrusion joined to the lower surface of the base, each second protrusion having a height; and
   wherein the spacer article further comprises
   (c) a second constrained layer damper attached to the lower surface of the base, wherein the second constrained layer damper has a height such that it ranges from about 90 to about 300 percent of the height of the second protrusion having a greatest height on the lower surface of the base,
      wherein the second constrained layer damper independently comprises:
         (i) a constraining layer;
         (ii) a layer of vibration damping material bonded to the constraining layer, wherein the vibration damping material comprises viscoelastic material, wherein the storage modulus of the constraining layer is greater than that of the viscoelastic material in the vibration damping material; and
   wherein each constrained layer damper is attached to the base via its vibration damping material layer.

3. The spacer article of claim 2, wherein said first constrained layer damper has a height such that it ranges from about 95 to about 200 percent of the height of the first protrusion having a greatest height on the upper surface of the base and wherein said second constrained layer damper has a height such that it ranges from about 95 to about 200 percent of the height of the second protrusion having a greatest height on the lower surface of the base.

4. The spacer article of claim 3, wherein said second constrained layer damper has a height such that it ranges from about 102 to about 120 percent of the height of the second protrusion having a greatest height on the lower surface of the base.

5. The spacer article of claim 1 wherein the spacer article has a force retention of at least about 92 percent of an initial compression force of $1.4 \times 10^6$ Pascals applied to the spacer article for about 0.2 to about 2 seconds at about 25° C. at about 15 minutes after the application of the initial compression force.

6. The spacer article of claim 2, wherein the first constrained layer damper has a height about 0.01 to about 0.5 mm greater than the height of the first protrusion having the greatest height on the upper surface of the base, and wherein the second constrained layer damper has a height about 0.01 to about 0.5 mm greater than the height of the second protrusion having the greatest height on the lower surface of the base.

7. The spacer article of claim 2 wherein the spacer article has a force retention of at least about 92 percent of an initial compression force of $1.4 \times 10^6$ Pascals applied to the spacer article for about 0.2 to about 2 seconds at about 25° C. at about 15 minutes after the application of the initial compression force.

8. The spacer article of claim 2, wherein the first constrained layer damper has a height about 0.02 to about 0.1 mm greater than the height of the first protrusion having the greatest height on the upper surface of the base, and wherein the second constrained layer damper has a height about 0.02 to about 0.1 mm greater than the height of the second protrusion having the greatest height on the lower surface of the base.

9. A disk drive assembly comprising:
   (a) a disk drive, the disk drive having a spindle;
   (b) a rotatable storage article positioned such that the spindle extends through a through hole in the rotatable storage article;
   (c) the damped spacer article of claim 2, wherein the damped spacer article is positioned such that the spindle extends through the through hole in the spacer article, wherein the spacer article is positioned adjacent to and in contact with the rotatable storage article; and
   (d) a means for securing the rotatable storage article and spacer article onto the spindle.

10. The spacer article of claim 1, wherein said first constrained layer damper has a height such that it ranges from about 95 to about 200 percent of the height of the first protrusion having a greatest height on the upper surface of the base.

11. The spacer article of claim 10, wherein said first constrained layer damper has a height such that it ranges from about 102 to about 120 percent of the height of the first protrusion having a greatest height on the lower surface of the base.

12. The spacer article of claim 1 wherein the constrained layer damper is segmented.

* * * * *